US012668711B2

(12) United States Patent
Laporte et al.

(10) Patent No.: US 12,668,711 B2
(45) Date of Patent: Jun. 30, 2026

(54) PHOTOLUMINESCENT SECURITY INK FOR CONTINUOUS INK-JET PRINTING

(71) Applicant: SICPA HOLDING SA, Prilly (CH)

(72) Inventors: Cécile Laporte, Aubonne (CH);
Pierre-Sylvain Philippon, Saint Julien en Genevois (CH); Salvatore Cartesio, Milazzo (IT); Mickael Bailleul, Labergement Sainte Marie (FR); Riccardo Ruggerone, Echallens (CH)

(73) Assignee: SICPA HOLDING SA, Prilly (CH)

( * ) Notice: Subject to any disclaimer, the term of this patent is extended or adjusted under 35 U.S.C. 154(b) by 143 days.

(21) Appl. No.: 18/685,162

(22) PCT Filed: Aug. 18, 2022

(86) PCT No.: PCT/EP2022/073044
§ 371 (c)(1),
(2) Date: Feb. 20, 2024

(87) PCT Pub. No.: WO2023/021126
PCT Pub. Date: Feb. 23, 2023

(65) Prior Publication Data
US 2025/0188300 A1      Jun. 12, 2025

(30) Foreign Application Priority Data

Aug. 20, 2021    (EP) .................................... 21192480

(51) Int. Cl.
| | |
|---|---|
| *C09D 11/50* | (2014.01) |
| *B41M 3/14* | (2006.01) |
| *B42D 25/382* | (2014.01) |
| *C09D 11/10* | (2014.01) |
| *C09D 11/14* | (2006.01) |
| *C09D 11/322* | (2014.01) |
| *C09D 11/36* | (2014.01) |
| *C09K 11/77* | (2006.01) |
| *B42D 25/387* | (2014.01) |

(52) U.S. Cl.
CPC ............ *C09D 11/50* (2013.01); *B41M 3/144* (2013.01); *B42D 25/382* (2014.10); *C09D 11/10* (2013.01); *C09D 11/14* (2013.01); *C09D 11/322* (2013.01); *C09D 11/36* (2013.01); *C09K 11/7773* (2013.01); *B42D 25/387* (2014.10)

(58) Field of Classification Search
CPC .... B41M 3/144; B42D 25/382; B42D 25/387; C09D 11/10; C09D 11/14; C09D 11/322; C09D 11/36; C09D 11/50; C09K 11/7705; C09K 11/7773
See application file for complete search history.

(56) References Cited

U.S. PATENT DOCUMENTS

| | | | |
|---|---|---|---|
| 2005/0068395 A1* | 3/2005 | Haubold | B42D 25/373 347/100 |
| 2008/0293052 A1 | 11/2008 | Liang et al. | |
| 2010/0261263 A1* | 10/2010 | Vo-Dinh | F21K 2/00 977/773 |
| 2011/0114891 A1 | 5/2011 | Isobe et al. | |
| 2020/0270464 A1 | 8/2020 | Tsunematsu et al. | |

FOREIGN PATENT DOCUMENTS

| | | |
|---|---|---|
| CN | 102105543 | 6/2011 |
| CN | 102321403 | 1/2012 |
| CN | 102373061 | 3/2012 |
| CN | 103911154 | 7/2014 |
| CN | 105694889 | 6/2016 |
| CN | 104371424 | 11/2016 |
| CN | 111704899 | 9/2020 |
| EP | 1314766 | 5/2003 |
| TW | 201908420 | 3/2019 |
| WO | 2015137995 | 9/2015 |
| WO | 2016186706 | 11/2016 |

OTHER PUBLICATIONS

Blumenthal et al., "Patterned Direct-write and Screen-printing of NIR-to-visible Upconverting Ink for Security Applications", Nanotechnology, 2012, vol. 23, 185305, p. 1-8 (Year: 2012).*
Taiwanese Office Action in counterpart Taiwanese Patent Application No. 111130871 dated Sep. 17, 2025 (and English language translation of Office Action), 8 pages.
Simultaneous morphology manipulation and upconversion luminescence enhancement, Ding et al. Nature (2015), 5, 12745, 14 pages.
International Search Report and Written Opinion issued with respect to application No. PCT/EP2022/073044.
Chinese Office Action in counterpart Chinese Patent Application No. 202280056607.4 dated Jan. 15, 2026 (and English language translation of Office Action).

* cited by examiner

*Primary Examiner* — Gerard Higgins
(74) *Attorney, Agent, or Firm* — MUNCY, GEISSLER, OLDS & LOWE, P.C.

(57) ABSTRACT

The present invention provides a photoluminescent security ink for continuous ink-jet printing, wherein said ink has a viscosity of about 1.5 mPas to about 6 mPas at 25° C., and comprises: a) from about 4 wt-% to about 6 wt-% of uncapped $NaX_{1-y-z}F_4Yb_yZ_z$ nanoparticles; b) from about 1.5 wt-% to about 10 wt-% of a dispersing agent; c) from about 80 wt-% to about 90 wt-% of an organic solvent; and d) from about 0.1 wt-% to about 1 wt-% of a conductive salt, as well as a process for producing said ink, and a process for manufacturing a photoluminescent security feature on an article, or a value document, with said ink.

17 Claims, 2 Drawing Sheets

100kX

200kX

PHOTOLUMINESCENT SECURITY INK FOR CONTINUOUS INK-JET PRINTING

FIELD OF THE INVENTION

The present invention relates to the field of photoluminescent security inks for continuous ink-jet printing and processes for producing such photoluminescent security inks.

BACKGROUND OF THE INVENTION

Counterfeit articles can cause significant economic and other damage to both the producer of authentic non-counterfeit articles and the consumer of the counterfeit articles. Counterfeit value documents can likewise cause economic and/or other damage. One method to prevent counterfeiting of articles and/or documents is to print a security feature on the value document, on the packaging and/or labeling for an article, or directly on the article using a special security ink that can be later authenticated. Counterfeit articles/value documents will not have the security feature made with this special security ink and therefore, cannot be authenticated.

The use of photoluminescent materials (i.e. of materials that are capable of emitting detectable quantities of radiation in infrared (IR), visible (VIS) and/or ultraviolet (UV) spectrum upon excitation with an external electromagnetic radiation) in the field of security inks is well known in the art. Photoluminescent material containing security inks enable the production of both semi-overt/semi-covert and covert security features. Both semi-overt/semi-covert and covert security features cannot be authenticated by the unaided eye and are difficult to be detected without prior training and knowledge. In addition to training and knowledge, the authentication of such security features requires specialized equipment, such as lighting devices for semi-overt/semi-covert security features and reading/detecting devices for covert security feature.

Rare-earth doped sodium yttrium fluoride ($NaYF_4$) and sodium gadolinium fluoride ($NaGdF_4$) materials are known to display NIR-to-visible up-conversion luminescence and/or NIR-to-NIR down-conversion luminescence and are interesting candidates to produce security inks intended for manufacturing of semi-overt/semi-covert and covert security features.

For example, international patent application publication number WO2015137995A1 describes an upconverting security ink containing nanocrystals that host at least two lanthanides and are capped with an organic ligand, a polymer and a solvent capable of dissolving the polymer. The as-synthesized nanocrystals have on their surface an organic ligand, such as oleic acid, acting as a capping agent, which ensures their dispersion in non-polar solvents to slightly-polar organic solvents. To modify the solubility of the as-synthesized nanocrystals it is required to conduct a tedious, but mandatory step for exchanging the capping agent on the surface of the nanocrystals. The inks exemplified by WO2015137995A1 contain 1 wt-% or 2 wt-% of $\beta$-$NaYF_4$:3% Er, 17% Yb nanocrystals capped with oleic acid and 1 wt-% poly(methyl methacrylate) in 90:10 v/v toluene/methyl benzoate solvent mixture and are printable by direct-write printing. Besides requiring harsh, expensive and long-lasting manufacturing conditions that render the manufacturing process difficult to be up-scaled at an industrial level, the inks described by WO2015137995A1 contain health and environment detrimental solvents, which are to be avoided in an industrial environment, and are not suitable for high-speed industrial printing.

Ink-jet printing is a well-known non-contact printing technique, which enables printing at high speed (more than 100 meters per second) fixed and variable information to virtually any surface including those that are irregular and fragile. Ink-jet printing is a well-suited technique for printing applications in the industrial and office sectors. Depending on the mechanism used for producing the droplets, two different ink-jet printing techniques can be distinguished: continuous ink-jet printing (CIJ) and drop-on-demand printing (DOD).

International patent application publication number WO2016186706A1 describes a water based upconverting DOD ink-jet ink comprising an upconverting pigment including a $\beta$-$NaYF_4$ crystal doped with at least one of erbium, ytterbium or thulium; a dispersant; a humectant; and water. The dispersants include one or more of acrylic polymers, alkali salts of sulphonated naphthalene formaldehyde condensates, lignin or lignin derivatives, such as lignosulphonate, the reaction products with alkali sulfite and formaldehyde, or other block copolymers with pigment affinic groups. The upconverting DOD ink-jet ink is obtained by pre-mixing an upconverting pigment, a dispersant and water; forming an upconverting pigment dispersion by milling the mixture until a particle size of the upconverting pigment reaches a desired particle size; and admixing a humectant to the upconverting pigment dispersion. The manufacturing process exemplified by WO2016186706A1 involves wet media milling steps of about eight hours to produce an upconverting pigment with an average particle size lower or equal to about 150 nm. Besides being time- and energy consuming, the milling processes usually leads to particles surface defects, which are highly detrimental for the luminescence properties of the particles, resulting in decreased luminescence yield and/or inconsistent luminescence spectral properties.

Because of reasons such as increased throw distance and ink performance (for e.g.: fast drying), CIJ printing is more suitable for direct marking of articles and value documents than DOD printing. Owing to its versatility in terms of porous and non-porous substrate to be printed (e.g.: paper, plastic, glass, ceramics, metal, alloys), its ability to print variable information at high speed, and the user-friendly processing steps, CIJ ink-jet printing is ideal for anti-counterfeit printing of articles and value documents in an industrial environment.

A need remains in the art for continuous ink-jet security inks containing rare-earth doped sodium yttrium fluoride ($NaYF_4$) or rare-earth doped sodium gadolinium fluoride ($NaGdF_4$) materials for producing semi-covert/semi-overt and covert security features for value documents and articles, as well as for cost- and time-expedient processes that are industrially up-scalable for producing such continuous ink-jet security inks.

SUMMARY OF THE INVENTION

Accordingly, it is the object of the present invention to provide a photoluminescent security ink for continuous ink-jet printing, wherein said ink has a viscosity of about 1.5 mPas to about 6 mPas at 25° C., preferably of about 1.5 mPas to about 4.5 mPas at 25° C., and comprises:

a) from about 1 wt-% to about 6 wt-%, preferably from about 4 wt-% to about 5 wt-%, of uncapped $NaX_{1-y-z}F_4Yb_yZ_z$ nanoparticles wherein X is selected from the group consisting of $Y^{3+}$ (trivalent yttrium cation) and $Gd^{3+}$ (trivalent gadolinium cation);

Z is selected from the group consisting of $Er^{3+}$ (trivalent erbium cation), $Tm^{3+}$ (trivalent thulium cation) and $Ho^{3+}$ (trivalent holmium cation);

$$0 < y+z \le 0.4, \text{ and}$$

$$0 \le z \le 0.1,$$

and wherein the uncapped $NaX_{1-y-z}F_4Yb_yZ_z$ nanoparticles have a mean diameter of between about 30 nm to about 70 nm as measured by scanning electron microscopy;

b) from about 1.5 wt-% to about 10 wt-% of a dispersing agent selected from the group consisting of a polyvinyl acetal resin, a vinyl chloride copolymer containing from about 60 wt-% to about 95 wt-% of vinyl chloride, a polyurethane resin, a nitrocellulose resin, an ester cellulose resin, an alkyl meth (acrylate) polymer, and mixtures thereof;

c) from about 80 wt-% to about 90 wt-% of an organic solvent selected from the group consisting of a ketone, an alcohol, an ester, and mixtures thereof; and d) from about 0.1 wt-% to about 1 wt-%, preferably from about 0.3 wt-% to about 1 wt-%, more preferably from about 0.5 wt-% to about 1 wt-%, and most preferably about 0.5 wt-%, of a conductive salt, wherein the weight percents are based on the total weight of the photoluminescent security ink.

The photoluminescent ink-jet security ink claimed herein may further comprise:

e) up to 7 wt-% of a rheology modifier selected from the group consisting of a polyvinyl chloride copolymer containing from about 60 wt-% to about 95 wt-% of vinyl chloride, a cellulose resin, and mixtures thereof, wherein the weight percents are based on the total weight of the photoluminescent security ink.

Further claimed and described herein is a process for producing the photoluminescent security ink for continuous ink-jet printing claimed herein, comprising the steps:

i) providing uncapped $NaX_{1-y-z}F_4Yb_yZ_z$ nanoparticles either as a powder, or as a slurry, wherein X, Z, y and z have the meanings defined herein, and wherein the uncapped $NaX_{1-y-z}F_4Yb_yZ_z$ nanoparticles have a mean diameter of between about 30 nm to about 70 nm as measured by scanning electron microscopy;

ii) providing a solution of a dispersing agent in an organic solvent, wherein the dispersing agent is selected from the group consisting of a polyvinyl acetal resin, a vinyl chloride copolymer containing from about 60 wt-% to about 95 wt-% of vinyl chloride, a polyurethane resin, a nitrocellulose resin, an ester cellulose resin, an alkyl (meth)acrylate polymer, and mixtures thereof, and the organic solvent is selected from the group consisting of a ketone, an alcohol, an ester, and mixtures thereof;

iii) dispersing the uncapped $NaX_{1-y-z}F_4Yb_yZ_z$ nanoparticles in the solution provided at step ii) to obtain a dispersion; and iv) adding to the dispersion obtained at step iii)

a conductive salt, from about 0.1 wt-% to about 1 wt-% based on the total weight of the photoluminescent security ink, optionally an organic solvent selected from the group consisting of a ketone, an alcohol, an ester, and mixtures thereof, optionally up to 7 wt-% based on the total weight of the photoluminescent security ink, of a rheology modifier selected from a polyvinyl chloride copolymer containing from about 60 wt-% to about 95 wt-% of vinyl chloride, a cellulose resin, and mixtures thereof, and optionally a colorant to provide the photoluminescent security ink for continuous inkjet printing.

Another aspect of the present invention is directed to a process for manufacturing a photoluminescent security feature on an article, or a value document, wherein said process comprises the steps:

applying by continuous ink-jet printing the photoluminescent security ink claimed and described herein on a surface of the article, or of a substrate of the value document so as to form a photoluminescent security ink layer, and drying the photoluminescent security ink layer to provide the photoluminescent security feature.

A further aspect according to the present invention relates to an article or a value document carrying the photoluminescent security feature obtained by the process claimed and described herein.

DETAILED DESCRIPTION

Definitions

Figure 1A:
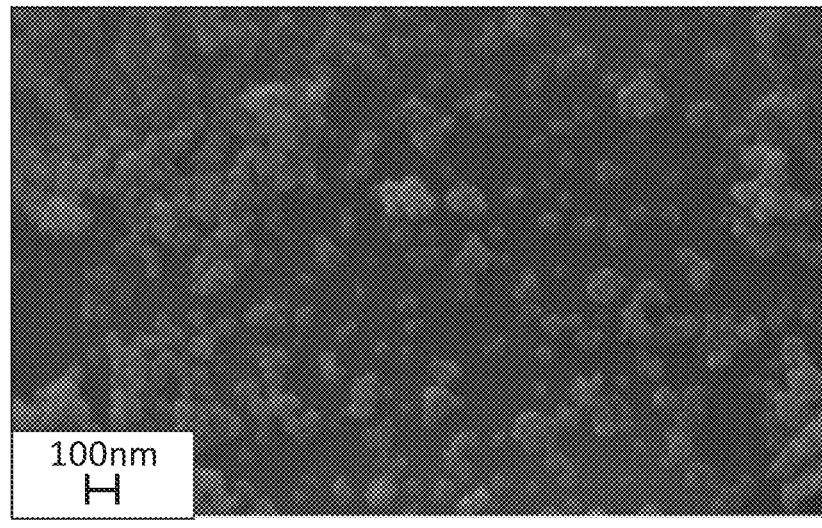
FIG. 1a shows a SEM image of the uncapped $NaYF_4$: $Yb_{0.18},Er_{0.02}$ nanoparticles (NP1) according to the present invention taken at 100 kx magnification.

The following definitions are to be used to interpret the meaning of the terms discussed in the description and recited in the claims.

As used herein, the article "a/an" indicates one as well as more than one and does not necessarily limit its referent noun to the singular.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Preferably, the range denoted by the term "about" denotes a range within ±3% of the value, more preferably ±1%. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

The term "comprising" as used herein is intended to be non-exclusive and open-ended. Thus, for instance a solution comprising a compound A may include other compounds besides A. However, the term "comprising" also covers, as a particular embodiment thereof, the more restrictive meanings of "consisting essentially of" and "consisting of", so that for instance "a solution comprising A, B, and optionally C" may also (essentially) consist of A, and B, or (essentially) consist of A, B, and C.

Where the present description refers to "preferred" embodiments/features, combinations of these "preferred" embodiments/features are also deemed to be disclosed as long as the specific combination of "preferred" embodiments/features is technically meaningful.

As used herein, the term "one or more" means one, two, three, four, etc.

Surprisingly, it has been found that a composition having a viscosity of about 1.5 mPas to about 6 mPas at 25° C., preferably of about 1.5 mPas to about 4.5 mPas at 25° C., and comprising:

a) from about 1 wt-% to about 6 wt-%, preferably from about 4 wt-% to about 5 wt-%, of uncapped $NaX_{1-y-z}F_4Yb_yZ_z$ nanoparticles wherein X is selected from the group consisting of $Y^{3+}$ (trivalent yttrium cation) and $Gd^{3+}$ (trivalent gadolinium cation);

Z is selected from the group consisting of $Er^{3+}$ (trivalent erbium cation), $Tm^{3+}$ (trivalent thulium cation) and $Ho^{3+}$ (trivalent holmium cation);

$0 < y+z \leq 0.4$, and $0 \leq z \leq 0.1$, wherein the uncapped $NaX_{1-y-z}F_4Yb_yZ_z$ nanoparticles have a mean diameter of between about 30 nm to about 70 nm as measured by scanning electron microscopy;

b) from about 1.5 wt-% to about 10 wt-% of a dispersing agent selected from the group consisting of a polyvinyl acetal resin, a vinyl chloride copolymer containing from about 60 wt-% to about 95 wt-% of vinyl chloride, a polyurethane resin, a nitrocellulose resin, an ester cellulose resin, an alkyl (meth)acrylate polymer, and mixtures thereof;

c) from about 80 wt-% to about 90 wt-% of an organic solvent selected from the group consisting of a ketone, an alcohol, an ester, and mixtures thereof; and d) from about 0.1 wt-% to about 1 wt-%, preferably from about 0.3 wt-% to about 1 wt-%, more preferably from about 0.5 wt-% to about 1 wt-%, and most preferably about 0.5 wt-%, of a conductive salt, wherein the weight percents are based on the total weight of the composition, is printable by continuous ink-jet, meets the requirements of industrial printing of security features both in terms of shelf-life stability and print quality, and enables the production of security features showing NIR-to-visible up-conversion photoluminescence and/or NIR-to-NIR down-conversion photoluminescence. Such security features are particularly useful for protecting articles and value documents against counterfeits and illegal reproduction.

As well known to the skilled person, a photoluminescent ink refers to an ink containing photoluminescent materials i.e. materials that are capable of emitting detectable quantities of radiation in infrared (IR), visible (VIS) and/or ultraviolet (UV) spectrum upon excitation with an external electromagnetic radiation. The uncapped $NaX_{1-y-z}F_4Yb_yZ_z$ nanoparticles described herein display NIR-to-visible up-conversion photoluminescence and/or NIR-to-NIR down-conversion photoluminescence. As well known to the skilled person, the term up-conversion photoluminescence refers to emission of light having a wavelength shorter than the excitation wavelength (for e.g.: visible 540 nm emission in response to near infrared 980 nm excitation), while the term down-conversion photoluminescence refers to emission of light having a wavelength longer than the excitation wavelength (for e.g.: visible 540 nm emission in response to UV 350 nm excitation).

As well known to the skilled person and used herein the term "continuous ink-jet printing" or "CIJ printing" refers to an ink-jet printing process, wherein a pump directs a liquid ink from a reservoir to a nozzle to create a continuous stream of ink droplets, which are subjected to a controlled and variable electrostatic field, and thereby, are charged as the droplets form according to the varying electrostatic field. The charged droplets are deflected to the proper location by passing through another electrostatic field to print the desired pattern on a substrate, or are recycled back to the reservoir for future use.

The photoluminescent security ink claimed and described herein is characterized by a viscosity of about 1.5 mPas to about 6 mPas at 25° C., preferably of about 1.5 mPas to about 4.5 mPas at 25° C., as measured using a Brookfield viscometer (model LV (low viscosity)) equipped with a spindle 00 at 60 rpm.

The photoluminescent security ink claimed and described herein comprises:

a) from about 1 wt-% to about 6 wt-%, preferably from about 4 wt-% to about 5 wt-%, of uncapped $NaX_{1-y-z}F_4Yb_yZ_z$ nanoparticles wherein X is selected from the group consisting of $Y^{3+}$ (trivalent yttrium cation) and $Gd^{3+}$ (trivalent gadolinium cation);

Z is selected from the group consisting of $Er^{3+}$ (trivalent erbium cation), $Tm^{3+}$ (trivalent thulium cation) and $Ho^{3+}$ (trivalent holmium cation);

$0 < y+z \leq 0.4$, and $0 \leq z \leq 0.1$, wherein the uncapped $NaX_{1-y-z}F_4Yb_yZ_z$ nanoparticles have a mean diameter of between about 30 nm to about 70 nm as measured by scanning electron microscopy.

As used herein, the term "uncapped $NaX_{1-y-z}F_4Yb_yZ_z$ nanoparticles" refers to $NaX_{1-y-z}F_4Yb_yZ_z$ nanoparticles that do not have a covalently bound capping agent on their surface for ensuring the dispersion of the $NaX_{1-y-z}F_4Yb_yZ_z$ nanoparticles in a solvent. As well-known to the skilled person, a capping agent is an amphiphilic molecule having a polar head group, which ensures the bonding of the capping agent via a coordinative covalent bond to the surface of the nanoparticle, and a non-polar hydrocarbon tail, which interacts with the encircling solvent medium, thereby ensuring the dispersion of the nanoparticle in said solvent. Examples of capping agent include the organic acid described in the international patent application publication number WO2015137995A1.

The herein described uncapped $NaX_{1-y-z}F_4Yb_yZ_z$ nanoparticles are inorganic nanoparticles made of, or consisting of a $NaX_{1-y-z}F_4Yb_yZ_z$ material, with X, Z, y, and z having the meanings described herein, and which do not have a covalently bound capping agent, such as an organic ligand, on their surface. Hence, the photoluminescent security ink claimed and described herein is free of capping agents.

As used herein, the term "diameter of an uncapped $NaX_{1-y-z}F_4Yb_yZ_z$ nanoparticle" corresponds to the maximum dimension of said uncapped $NaX_{1-y-z}F_4Yb_yZ_z$ nanoparticle as detectable in a scanning electron microscopy (SEM) image. The term "mean diameter" as used herein refers to a mean diameter determined by scanning electron microscopy (SEM) based on the diameter measured for at least 100 randomly selected uncapped $NaX_{1-y-z}F_4Yb_yZ_z$ nanoparticles, wherein the diameter of an uncapped $NaX_{1-y-z}F_4Yb_yZ_z$ nanoparticle corresponds to the maximum dimension of said uncapped $NaX_{1-y-z}F_4Yb_yZ_z$ nanoparticle as detectable in a scanning electron microscopy (SEM) image. Scanning electron microscopy (SEM) analysis was conducted using a second electron detector Evehart-Thornley from ZEISS for the surface analysis and topography.

The uncapped $NaX_{1-y-z}F_4Yb_yZ_z$ nanoparticles described herein preferably have a cubic ($\alpha$-) phase.

In the general formula $NaX_{1-y-z}F_4Yb_yZ_z$, it is preferred that the sum of y and z is higher than 0.001 i.e. $0.001 \leq y+z \leq 0.4$.

In the general formula $NaX_{1-y-z}F_4Yb_yZ_z$, it is more preferred that $0.1 \leq y+z \leq 0.4$ and $0 \leq z \leq 0.1$.

In the general formula $NaX_{1-y-z}F_4Yb_yZ_z$, it is further preferred that $0.1 \leq y \leq 0.35$ with X, Z, and z having the meanings described herein.

In a preferred embodiment according to the present invention, Z represents $Er^{3+}$ (trivalent erbium cation), $0.01 \leq z \leq 0.1$, and $y \geq z$. Thus, a preferred embodiment according to the present invention is directed to a photoluminescent security ink for continuous ink-jet printing as claimed and described herein comprising:

a) from about 1 wt-% to about 6 wt-%, preferably from about 4 wt-% to about 5 wt-%, of uncapped $NaX_{1-y-z}F_4Yb_yEr_z$ nanoparticles wherein $0.01 \leq z \leq 0.1$, $y \geq z$ and optionally $0.1 \leq y \leq 0.35$, preferably $0.1 \leq y \leq 0.3$. Nanoparticles of general formula $NaX_{1-y-z}F_4Yb_yEr_z$, wherein $0.01 \leq z \leq 0.1$, $y \geq z$ and optionally $0.1 \leq y \leq 0.35$, preferably $0.1 \leq y \leq 0.3$, exhibit strong photoluminescence intensities both in up-conversion and in down-conversion and are particularly useful for the production of photoluminescent security ink for CIJ to manufacture covert and semi-overt/semi-covert security features.

In an alternative preferred embodiment according to the present invention Z represents $Tm^{3+}$ (trivalent thulium cation), $0.01 \leq z \leq 0.05$, and $y \geq z$. Thus, a preferred embodiment according to the present invention is directed to a photoluminescent security ink for continuous ink-jet printing as claimed and described herein comprising:

a) from about 1 wt-% to about 6 wt-%, preferably from about 4 wt-% to about 5 wt-% of uncapped $NaX_{1-y-z}F_4Yb_yTm_z$ nanoparticles wherein $0.01 \leq z \leq 0.05$, $y \geq z$, and optionally $0.1 \leq y \leq 0.35$. Nanoparticles of general formula $NaX_{1-y-z}F_4Yb_yTm_z$, wherein $0.01 \leq z \leq 0.05$, $y \geq z$ and optionally $0.1 \leq y \leq 0.35$, exhibit strong photoluminescence intensities both in up-conversion and in down-conversion and are particularly useful for the production of photoluminescent security inks for CIJ to manufacture covert and semi-overt/semi-covert security features.

Preferably in the general formula $NaX_{1-y-z}F_4Yb_yZ_z$, X represents $Y^{3+}$ (trivalent yttrium cation). Hence, a photoluminescent security ink for continuous ink-jet printing as claimed and described herein comprising:

a) from about 1 wt-% to about 6 wt-%, preferably from about 4 wt-% to about 5 wt-%, of uncapped $NaY_{1-y-z}F_4Yb_yZ_z$ nanoparticles, wherein $0 < y+z \leq 0.4$, and $0 \leq z \leq 0.1$, and wherein the uncapped $NaY_{1-y-z}F_4Yb_yZ_z$ nanoparticles have a mean diameter of between about 30 nm to about 70 nm as measured by scanning electron microscopy, is preferred. Also preferred is a photoluminescent security ink for continuous ink-jet printing as claimed and described herein comprising either 30 a) from about 1 wt-% to about 6 wt-%, preferably from about 4 wt-% to about 5 wt-%, of uncapped $NaY_{1-y-z}F_4Yb_yEr_z$ nanoparticles wherein $0.01 \leq z \leq 0.1$, $y \geq z$, and optionally $0.1 \leq y \leq 0.35$, preferably $0.1 \leq y \leq 0.3$, or a) from about 1 wt-% to about 6 wt-%, preferably from about 4 wt-% to about 5 wt-%, of uncapped $NaY_{1-y-z}F_4Yb_yTm_z$ nanoparticles wherein $0.01 \leq z \leq 0.05$, $y \geq z$, and optionally $0.1 \leq y \leq 0.35$.

The photoluminescent security ink for continuous ink-jet printing claimed and described herein comprises:

b) from about 1.5 wt-% to about 10 wt-% of a dispersing agent selected from the group consisting of a polyvinyl acetal resin, a vinyl chloride copolymer containing from about 60 wt-% to about 95 wt-% of vinyl chloride, a polyurethane resin, a nitrocellulose resin, an ester cellulose resin, an alkyl (meth)acrylate polymer, and mixtures thereof.

The dispersing agent described herein ensures that the uncapped $NaX_{1-y-z}F_4Yb_yZ_z$, wherein X, Z, y and z have the meanings defined herein are uniformly dispersed throughout the photoluminescent security ink, do not sediment and/or aggregate in the photoluminescent security ink and that said ink is stable over the shelf life-time.

A preferred embodiment according to the present invention is directed to a photoluminescent security ink for continuous ink-jet printing as claimed and described herein, wherein the dispersing agent is selected from the group consisting of a polyvinyl acetal resin, a vinyl chloride copolymer containing from about 60 wt-% to about 95 wt-% of vinyl chloride, an alkyl (meth)acrylate polymer, and mixtures thereof and is present in the photoluminescent inkjet security ink in an amount from about 4 wt-% to about 10 wt-%, the weight percents being based on the total weight of the photoluminescent security ink.

The dispersing agent may be a polyvinyl acetal resin, preferably a polyvinyl acetal resin having a molecular weight lower than about 100'000 g/mol, more preferably a polyvinyl acetal resin having a molecular weight lower than about 80'000 g/mol, and most preferably a polyvinyl acetal resin having a molecular weight lower than about 50'000 g/mol, such as lower than about 40'000 g/mol, or lower than 30'000 g/mol. As well known to the skilled person, polyvinyl acetal resins are obtained by reacting a polyvinyl alcohol (PVA) with an aldehyde, such as an aldehyde containing 2 to 4 carbon atoms. Usually, the polyvinyl alcohol (PVA) used as starting material for the production of the polyvinyl acetal resins present residual acetyl groups because of incomplete saponification of the acetate esters. Thus, commonly the polyvinyl acetal resins contain a certain amount of acetyl groups. The polyvinyl acetal resin preferably contains a medium acetal content (i.e. from about 40% to about 75% of the hydroxyl groups originating from the polyvinyl alcohol are protected as an acetal). Preferably, the polyvinyl acetal resin is selected from a polyvinyl butyral resin, and a polyvinyl acetacetal resin. More preferably the polyvinyl acetal resin is a polyvinyl butyral resin, and most preferably the polyvinyl acetal resin is a polyvinyl butyral resin having a content of polyvinyl alcohol from about 11 wt-% to about 27 wt-%, and a content of polyvinyl acetate lower than about 8 wt-%. Commercially available polyvinyl butyral resins suitable to be used as a dispersing agent in the photoluminescent security ink according to the present invention include, but are not limited to, MOWITAL™ B 14 S, MOWITAL™ B 16 H, MOWITAL™ B 20 H, MOWITAL™ B 30 H, MOWITAL™ B 30 T, MOWITAL™ B 30 HH, PIOLOFORM® BL 16 from Kuraray; S-LEC® BL-10, S-LEC® BL-5, S-LEC® BL-1, and S-LEC® BL-1H from Sekisui Chemical Co. Ltd.

The dispersing agent may be a vinyl chloride copolymer containing from about 60 wt-% to about 95 wt-% of vinyl chloride, preferably having an average molecular weight lower than about 100'000 g/mol, more preferably lower than about 80'000 g/mol, and most preferably lower than about 70'000 g/mol, such as lower than about 60'000 g/mol, or lower than 50'000 g/mol, wherein the average molecular weight was determined by size exclusion chromatography using polystyrene as standard and tetrahydrofuran as solvent. Preferably, the polyvinyl chloride copolymer is selected from a vinyl chloride-vinyl acetate copolymer, a vinyl chloride-vinyl acetate-vinyl alcohol copolymer, a vinyl chloride-hydroxyalkylacrylate copolymer, such as vinyl chloride-2-hydroxypropyl acrylate copolymer, and a vinyl chloride-hydroxyalkylacrylate-Z-alkylenedioic acid, dialkyl ester copolymer, such as vinyl chloride-2-hydroxypropyl acrylate-2-butenedioic acid (Z)-, dibutyl ester copolymer. The vinyl chloride copolymer contains preferably at least 70 wt-% of vinyl chloride, more preferably at least 80 wt-% vinyl chloride. Commercially available vinyl chloride copolymers containing from about 60 wt-% to about 95 wt-% of vinyl chloride suitable to be used as dispersing agent in the photoluminescent security ink according to the present invention include, but are not limited to, VINNOL® E18/38, VINNOL® E15/45, VINNOL® H14/36, VINNOL® E15/45M, VINNOL® E15/40 A from Wacker Chemie; SOLBIN® TA3, SOLBIN® TAO, SOLBIN® CL, and SOLBIN® CNL from Nissin Chemical Industry Co., Ltd.

The dispersing agent may be a polyurethane resin, preferably a polyurethane resin having a molecular weight lower than about 100'000 g/mol, more preferably lower than about 80'000 g/mol, and most preferably lower than about 50'000 g/mol. As well known to the skilled person, polyurethane resins are obtained by reacting a polyol with a compound having two or more isocyanate groups. As used herein, the term polyurethane resin includes polyether polyurethanes and polyester polyether polyurethane. Commercially available polyurethane resins suitable to be used as dispersing agent in the photoluminescent security ink according to the present invention include, but are not limited to, Surkofilm® 72S, and Surkopak® 5244 from BIP (Oldbury) Limited.

The dispersing agent may be a nitrocellulose resin (cellulose nitrate), preferably a nitrocellulose resin having a low to medium nitrogen content i.e. a content of nitrogen of between about 10 wt-% to about 11.8 wt-%. As well known to the skilled person, a nitrocellulose resin is obtained through a reaction of cellulose with nitrating acid (i.e. a mixture of nitric acid and sulfuric acid). Preferably, the nitrocellulose resin has a viscosity of between about 20 and 40 s as measured by Cochius method using a 12 wt-% solution of the nitrocellulose resin in a mixture of butanol, ethyl glycol, toluene and ethanol in a ratio butanol:ethyl glycol:toluene:ethanol of 1:2:3:4. Commercially available nitrocellulose resins suitable to be used in the photoluminescent security ink claimed and described herein include, but are not limited to, WALSRODER™ NC CHIPS AM 330, WALSRODER™ NC CHIPS A400, WALSRODER™

NC CHIPS AM 500, WALSRODER™ FF A300, WALSRODER™ FF A400, WALSRODER™ FF A500, WALSRODER™ FF A600 from DuPont; Nitrex nitrocellulose LX3/5, LX5/8, LX8/13, MX 8/13, MX 3/5 from Nitrex Chemicals India Ltd.; and DLX3-5 from Nobel NC.

The dispersing agent may be an ester cellulose resin, preferably an ester cellulose resin having a number average molecular weight lower than about 70'000 g/mol, more preferably lower than about 50'000 g/mol, and most preferably lower than about 30'000 g/mol, such as lower than about 20'000 g/mol, as determined by gel permeation chromatography using polystyrene as standard. As well known to the skilled person, an ester cellulose resin is a resin obtained by cellulose esterification. The ester cellulose resin is preferably selected from a cellulose acetate resin (CAC), a cellulose acetate-butyrate resin (CAB), and a cellulose acetate-propionate resin (CAP), more preferably selected from a cellulose acetate-butyrate resin (CAB), and a cellulose acetate-propionate resin (CAP), and most preferably selected from a cellulose acetate-butyrate resin (CAB) having a content of acetyl groups from about 0.5 wt-% to about 13.5 wt-%, a content of hydroxyl groups from about 1.3 wt-% to about 5 wt-%, and a content of butyryl groups from about 38 wt-% to about 52 wt-%, and a cellulose acetate-propionate resin (CAP) having a content of a acetyl groups from about 0.5 wt-% to about 13.5 wt-%, a content of hydroxyl groups from about 1.3 wt-% to about 5 wt-% and a content of propionyl groups from about 42 wt-% to about 45 wt-%. Commercially available ester cellulose resin suitable to be used in the photoluminescent security ink claimed and described herein include, but are not limited to, CAB 551-0.01, CAB 551-0.2, CAB553-0.4, and CAP 482-0.5 available from Eastman.

The dispersing agent may be an alkyl (meth)acrylate polymer, preferably an alkyl (meth)acrylate polymer having a weight average molecular weight lower than about 150'000 g/mol, more preferably an alkyl (meth)acrylate polymer having a molecular weight lower than about 140'000 g/mol, and most preferably alkyl (meth)acrylate polymer having a molecular weight lower than about 130'000 g/mol. As used herein, the term "alkyl (meth) acrylate polymer" includes both alkyl (meth)acrylate homopolymers, and alkyl (meth)acrylate copolymers, such as alkyl acrylate-alkyl methacrylate copolymer, alkyl/alkyl acrylate copolymers, and alkyl/alkyl methacrylate copolymers. The terminology "alkyl (meth)acrylate" refers to alkyl acrylates and alkyl methacrylates, typically $C_1$-$C_8$ alkyl, such as methyl (meth)acrylate, ethyl (meth)acrylate, n-propyl (meth)acrylate, iso-propyl (meth)acrylate, n-butyl (meth)acrylate and so forth. Examples of alkyl meth (acrylate) polymer include, without limitation, methyl methacrylate polymer, methyl/n-butyl methacrylate copolymer, and methyl methacrylate-ethyl acrylate copolymer. Preferably the alkyl meth (acrylate) polymer is an alkyl acrylate-alkyl methacrylate copolymer. Commercially available alkyl (meth)acrylate polymers suitable to be used as a dispersing agent in the photoluminescent security ink according to the present invention include, but are not limited to: Elvacite® 4349, Elvacite® 2008C, Elvacite® 2010, Elvacite® 2013 from Lucite International; DIANAL BR50, DIANAL BR87, DIANAL PB 204 from Mitsubishi Chemical America; PARALOID™ B-82, PARALOID™ B-48N from DSM; NeoCryl® B728, NeoCryl® B814, and NeoCryl® B817 from DSM.

A photoluminescent security ink as claimed and described herein containing from about 4 wt-% to about 10 wt-% of a dispersing agent selected from the group consisting of polyvinyl butyral resin as described herein having a content of vinyl alcohol from about 11 wt-% to about 27 wt-%, and a content of acetate groups lower than about 8 wt-%, a vinyl chloride copolymer as described herein containing from about 80 wt-% to about 90 wt-% of vinyl chloride, and an alkyl acrylate-alkyl methacrylate copolymer as described herein, is especially preferred. Such photoluminescent security ink exhibits good properties in terms of stability and print quality.

The photoluminescent security ink claimed and described herein contains:

c) from about 80 wt-% to about 90 wt-% of an organic solvent selected from the group consisting of a ketone, an alcohol, an ester, and mixtures thereof. The organic solvent preferably contains no organic solvents that will be disallowed by health and safety regulations in Japan, Europe, and/or the United States.

Preferably, the alcohol is selected from ethanol, n-propanol, iso-propanol, n-butanol, and mixtures thereof, more preferably the alcohol is ethanol.

Preferably, the ester is selected from methyl acetate, ethyl acetate, n-propyl acetate, isopropyl acetate, n-butyl acetate, t-butyl acetate, and mixtures thereof.

In a preferred embodiment, the organic solvent is a ketone. The ketone is preferably selected from acetone, methyl-ethyl-ketone (MEK), methyl-propyl-ketone (MPK), methyl-isopropyl-ketone (MIPK), diethyl-ketone (DK), and mixtures thereof, more preferably selected from methyl-ethyl-ketone (MEK), methyl-propyl-ketone (MPK), methyl-isopropyl-ketone (MIPK), and diethyl-ketone (MEK), and most preferably is methyl-ethyl-ketone (MEK).

The photoluminescent security ink claimed and described herein contains:

d) from about 0.1 wt-% to about 1 wt-%, preferably from about 0.3 wt-% to about 1 wt-%, more preferably from about 0.5 wt-% to about 1 wt-%, and most preferably about 0.5 wt-%, of a conductive salt which imparts conductivity to the ink, the weight percents being based on the total weight of the photoluminescent security ink. The conductive salt contains a cation selected from alkali metals cations, such as lithium cation (Li$^+$), sodium cation (Na$^+$) and potassium cation (K$^+$); alkaline-earth metals cations, such as magnesium cation (Mg$^{2+}$) and calcium cation (Ca$^{2+}$); and quaternary ammonium cations, such as tetra-butyl ammonium; and an anion selected from halides (chlorides, bromides, iodides, fluorides), perchlorates, nitrates, thiocyanates, formates, acetates, sulfates, sulfonates, propionates, trifluoroacetates, triflates (trifluoromethanesulfonates), hexafluoro-phosphates, hexafluoroantimonates, tetrafluoroborates, picrates and carboxylates. Preferably, the conductive salt is selected from lithium perchlorate, lithium nitrate, potassium hexafluorophosphate, and mixtures thereof.

The photoluminescent security ink claimed and described herein may further contain:

e) up to 7 wt-%, preferably from about 0.2 wt-% to about 6.5 wt-%, of a rheology modifier selected from the group consisting of a polyvinyl chloride copolymer containing from about 60 wt-% to about 95 wt-% of vinyl chloride as described herein, a cellulose resin, and mixtures thereof, wherein the weight percents are based on the total weight of the photoluminescent security ink. The use of the rheology modifier described herein enables modifying/altering the viscosity of the photoluminescent security ink for continuous ink-jet printing claimed and described herein without impacting the drop jettability of said ink.

The rheology modifier may be a cellulose resin. The cellulose resin is preferably selected from an ester cellulose resin as described herein, a nitrocellulose resin as described herein, and an ether cellulose resin, and more preferably is an ether cellulose resin.

As well known to the skilled person, an ether cellulose resin is a resin obtained by cellulose etherification. The ether cellulose resin has preferably a viscosity of between about 3 and about 110 mPas at 25° C., more preferably of about 3 and about 11 mPas at 25° C., wherein the viscosity was measured using a 5 wt-% ether cellulose resin in a mixture of toluene and ethanol (toluene:ethanol ratio=80:20) and a Ubbelohde viscometer. The ether cellulose resin is preferably selected from an ethyl-cellulose resin, a methylcellulose resin, a carboxymethylcellulose resin, a hydroxyethyl-cellulose resin, and a hydroxypropylcellulose resin, more preferably selected from an ethyl-cellulose resin, and a methylcellulose resin, and most preferably is an ethylcellulose resin having a content of ethoxy groups from about 44 wt-% to about 50 wt-%. Commercially available ether cellulose resins suitable to be used in the photoluminescent security ink claimed and described herein include, but are not limited to, ETHOCEL™ Standard 4, ETHOCEL™ Standard 7, ETHOCEL™ Standard 10, ETHOCEL™ Standard 20, and ETHOCEL™ Standard 100 from DuPont.

The rheology modifier is preferably selected from the group consisting of a polyvinyl chloride copolymer containing from about 80 wt-% to about 90 wt-% of vinyl chloride as described herein, an ethyl cellulose resin as described herein, and mixtures thereof.

To impart a color to the security feature made with the photoluminescent security ink claimed and described herein, said ink may contain a colorant, such as a dye or a pigment.

The dye used in the photoluminescent security ink claimed and described herein is preferably selected from the group consisting of acid dyes, basic dyes, reactive dyes, solvent dyes, disperse dyes, mordant dyes, and mixtures thereof. Conveniently, the dye does not interfere with the photoluminescence exhibited by the $NaX_{1-y-z}F_4Yb_yZ_z$ nanoparticles (i.e. does not decrease the photoluminescence intensity at one or more predefined wavelengths in the VIS- and/or NIR-spectrum range and/or the VIS- and/or NIR integrated photoluminescence exhibited by the $NaX_{1-y-z}F_4Yb_yZ_z$ nanoparticles) and does not absorb in the range from about 850 nm to about 1100 nm.

The dye may be present in an amount from about 0.1 wt-% to about 3 wt-%, preferably from about 0.1 wt-% to about 1 wt-%, more preferably from about 0.1 wt-% to about 0.5 wt-%, the weight percents being based on the total weight of the photoluminescent security ink.

Preferably, the dye is a solvent dye that does not interfere with the photoluminescence exhibited by the $NaX_{1-y-z}F_4Yb_yZ_z$ nanoparticles (i.e. does not decrease the photoluminescence intensity at one or more predefined wavelengths in the VIS- and/or NIR-spectrum range and/or the VIS- and/or NIR integrated photoluminescence exhibited by the $NaX_{1-y-z}F_4Yb_yZ_z$ nanoparticles), and does not absorb in the range from about 850 nm to about 1100 nm. Examples of solvent dyes include, but are not limited to, naphthol dyes, azo dyes, metal complex dyes, anthraquinone dyes, quinoimine dyes, indigoid dyes, benzoquinone dyes, carbonium dyes, naphthoquinone dyes, naphthalimide dyes, phthalocyanine dyes, and perylene dyes.

The ink of the invention may further include one or more additives, such as plasticizers, surfactants, defoamers, adhesion promoters, and mixtures thereof. The additive preferably is miscible with the ink and does not phase separate from the rest of ink composition during the shelf-life.

Examples of plasticizers that are suitable for use in embodiments of the invention include, but are not limited to, PLASTICIZER #80, available from RIT-CHEM® Co., Inc. The plasticizer additive can be present in an amount from about 0.1 wt-% to about 5 wt-%, or preferably from about 0.3 wt-% to about 3 wt-%, the weight percents being based on the total weight of the photoluminescent security ink.

Examples of surfactants that can be used include, but are not limited to, fluorosurfactants, siloxanes, silicones, silanols, polyoxyalkyleneamines, propoxylated (poly(oxypropylene)) diamines, alkyl ether amines, nonyl phenol ethoxylates, ethoxylated fatty amines, quaternized copolymers of vinylpyrrolidone and dimethyl aminoethyl methacrylate, fluorinated organic acid diethanolamine salts, alkoxylated ethylenediamines, polyethylene oxides, polyoxyalkylene polyalkylene polyamines amines, polyoxyalkylene polyalkylene polyimines, alkyl phosphate ethoxylate mixtures, polyoxyalkylene derivatives of propylene glycol, and polyoxyethylated fatty alcohols, and mixtures thereof. A preferred specific example of a suitable polymeric surfactant is SILWET® L7622, available from GENERAL ELECTRIC®, which is a silicone surfactant. The surfactant additive can be present in an amount from about 0.01 wt-% to about 1.0 wt-%, or preferably from about 0.1 wt-% to about 1.0 wt-%, the weight percents being based on the total weight of the photoluminescent security ink.

The ink also may include an adhesion promoter. A suitable adhesion promoter is a silane, such as SILQUEST® WET-LINK 78, which is glycidoxypropyl diethoxymethylsilane, SILQUEST® A-186 SILANE, which is beta-(3,4-epoxycyclohexyl)ethyltrimethoxy silane, and SILQUEST® A-187 SILANE, which is gamma-glycidoxypropyltrimethoxy silane, all available from GENERAL ELECTRIC®. The adhesion promoter can be present in an amount from about 0.1 wt-% to about 2 wt-%, preferably from about 0.2 wt-% to about 1.0 wt-%, and more preferably about 0.5 wt-%, the weight percents being based on the total weight of the photoluminescent security ink.

Another aspect according to the present invention is directed to a process for producing the photoluminescent security ink for continuous ink-jet printing claimed herein, wherein said process comprises, preferably consists of, the following steps:

i) providing uncapped $NaX_{1-y-z}F_4Yb_yZ_z$ nanoparticles either as a powder, or as a slurry, wherein X, Z, y and z have the meanings defined herein, and wherein the uncapped $NaX_{1-y-z}F_4Yb_yZ_z$ nanoparticles have a mean diameter of between about 30 nm to about 70 nm as measured by scanning electron microscopy;

ii) providing a solution of a dispersing agent in an organic solvent, wherein the dispersing agent is selected from the group consisting of a polyvinyl acetal resin, a vinyl chloride copolymer containing from about 60 wt-% to about 95 wt-% of vinyl chloride, a polyurethane resin, a nitrocellulose resin, an ester cellulose resin, an alkyl (meth)acrylate polymer, and mixtures thereof; and the organic solvent is selected from the group consisting of a ketone, an alcohol, an ester, and mixtures thereof;

iii) dispersing the uncapped $NaX_{1-y-z}F_4Yb_yZ_z$ nanoparticles in the solution provided at step ii) to obtain a dispersion; and iv) adding to the dispersion obtained at step iii)

a conductive salt, from about 0.1 wt-% to about 1 wt-% based on the total weight of the photoluminescent security ink, optionally an organic solvent selected from the group consisting of a ketone, an alcohol, an ester, and mixtures thereof, optionally up to 7 wt-% based on the total weight of the photoluminescent security ink, of a rheology modifier selected from the group consisting of a polyvinyl chloride copolymer containing from about 60 wt-% to about 95 wt-% of vinyl chloride, a cellulose resin, and mixtures thereof, and optionally a colorant, preferably a dye selected from the group consisting of acid dyes, basic dyes, reactive dyes, solvent dyes, disperse dyes, mordant dyes, and mixtures thereof, to provide the photoluminescent security ink for continuous ink-jet printing according to the present invention.

The manufacturing process claimed herein is industrially scalable and enables the production in a cost- and time-efficient manner of a variety of photoluminescent security inks.

As used herein the terms "powder", "uncapped $NaX_{1-y-z}F_4Yb_yZ_z$ nanoparticles as a powder", and "powder of uncapped $NaX_{1-y-z}F_4Yb_yZ_z$ nanoparticles" refer to the herein described uncapped $NaX_{1-y-z}F_4Yb_yZ_z$ nanoparticles in a dry form. As used herein, the term "slurry", "uncapped $NaX_{1-y-z}F_4Yb_yZ_z$ nanoparticles as a slurry", and "slurry of uncapped $NaX_{1-y-z}F_4Yb_yZ_z$ nanoparticles" refer to a suspension of the herein described uncapped $NaX_{1-y-z}F_4Yb_yZ_z$ nanoparticles in the herein described organic solvent. Conveniently, both a powder of the herein described uncapped $NaX_{1-y-z}F_4Yb_yZ_z$ nanoparticles and a slurry of herein described uncapped $NaX_{1-y-z}F_4Yb_yZ_z$ nanoparticles can be used for manufacturing the photoluminescent security ink according to the present invention.

Preferably, step i) of the manufacturing process claimed herein comprises the following steps conducted in the order i-1) to i-3):

i-1) mixing a first solution of ammonium fluoride in ethylene glycol with a second solution containing sodium chloride, $X(NO_3)_3$, $Yb(NO_3)_3$, and optionally $Z(NO_3)_3$, in ethylene glycol, wherein X and Z have the meanings defined herein to form a mixture;

i-2) stirring the mixture obtained at step i-1) at a temperature from about 120° C. to about 170° C. for at least two hours to form uncapped $NaX_{1-y-z}F_4Yb_yZ_z$ nanoparticles; and i-3) isolating the uncapped $NaX_{1-y-z}F_4Yb_yZ_z$ nanoparticles as a powder, or as a slurry.

Steps i-1) and i-2) of the manufacturing process claimed herein provide uncapped $NaX_{1-y-z}F_4Yb_yZ_z$ nanoparticles having a mean diameter of between about 30 nm to about 70 nm as measured by scanning electron microscopy. This is particularly advantageous because the as-synthesized $NaX_{1-y-z}F_4Yb_yZ_z$ nanoparticles do not have a covalently bound capping agent on their surface and can be directly dispersed in a variety of dispersing agents as described herein to provide stable photoluminescent security inks, and furthermore, said nanoparticles have a particle size well-suited for continuous ink-jet printing. Conveniently, the manufacturing process claimed herein involves neither milling steps, which are time- and energy-consuming, and usually have a negative impact on the photoluminescence properties, nor surface modification steps to remove/exchange the capping agent on the surface of the nanoparticles, which are generally harsh, expensive and long-lasting.

In the manufacturing process claimed and described herein, preferably step i-3) comprises the following steps:

i-4) addition of water, preferably of deionized water, followed by centrifugation to form a supernatant and to sediment the uncapped $NaX_{1-y-z}F_4Yb_yZ_z$ nanoparticles, and subsequent decanting of the supernatant; and either i-5) drying the uncapped $NaX_{1-y-z}F_4Yb_yZ_z$ nanoparticles to yield the uncapped $NaX_{1-y-z}F_4Yb_yZ_z$ nanoparticles as a powder, and optionally subjecting the powder to a heating treatment at a temperature of between 250° C. to about 350° C. for about 1 to 3 hours;

or i-6) dispersing the uncapped $NaX_{1-y-z}F_4Yb_yZ_z$ nanoparticles in an organic solvent selected from the group consisting of a ketone, an alcohol, an ester, and mixtures thereof, followed by centrifugation to form a supernatant and to sediment the uncapped $NaX_{1-y-z}F_4Yb_yZ_z$ nanoparticles, and subsequent decanting of the supernatant to yield the uncapped $NaX_{1-y-z}F_4Yb_yZ_z$ nanoparticles as a slurry.

The optional heating treatment of the powder of uncapped $NaX_{1-y-z}F_4Yb_yZ_z$ nanoparticles at a temperature of between 250° C. to about 350° C. for about 1 to 3 hours advantageously results in an increase of the intensity of the photoluminescence signal exhibited by said uncapped $NaX_{1-y-z}F_4Yb_yZ_z$ nanoparticles.

In the production process claimed herein step i-4) is preferably conducted at least twice, more preferably at least thrice and/or step i-6) is preferably conducted at least twice, more preferably at least thrice.

In a preferred embodiment according to the present invention, step i) of the manufacturing process claimed herein comprises, preferably consists of, the following steps:

i-1) mixing a first solution of ammonium fluoride in ethylene glycol with a second solution containing sodium chloride, $X(NO_3)_3$, $Yb(NO_3)_3$, and optionally $Z(NO_3)_3$, in ethylene glycol, wherein X and Z have the meanings defined herein to form a mixture;

i-2) stirring the mixture obtained at step i-1) at a temperature from about 120° C. to about 170° C. for at least two hours to form uncapped $NaX_{1-y-z}F_4Yb_yZ_z$ nanoparticles;

i-4) addition of water, preferably of deionized water, followed by centrifugation to form a supernatant and to sediment the uncapped $NaX_{1-y-z}F_4Yb_yZ_z$ nanoparticles, and subsequent decanting of the supernatant; and i-5) drying the uncapped $NaX_{1-y-z}F_4Yb_yZ_z$ nanoparticles to provide the uncapped $NaX_{1-y-z}F_4Yb_yZ_z$ nanoparticles as a powder, and optionally subjecting the powder to a heating treatment at a temperature of between 250° C. to about 350° C. for about 1 to 3 hours; wherein step i-4) is preferably conducted at least twice, more preferably at least thrice.

In an alternative embodiment according to the present invention, step i) of the manufacturing process claimed herein comprises, preferably consists of, the following steps:

i-1) mixing a first solution of ammonium fluoride in ethylene glycol with a second solution containing sodium chloride, $X(NO_3)_3$, $Yb(NO_3)_3$, and optionally $Z(NO_3)_3$, in ethylene glycol, wherein X and Z have the meanings defined herein to form a mixture;

i-2) stirring the mixture obtained at step i-1) at a temperature from about 120° C. to about 170° C. for at least two hours to form uncapped $NaX_{1-y-z}F_4Yb_yZ_z$ nanoparticles;

i-4) addition of water, preferably of deionized water, followed by centrifugation to form a supernatant and to sediment the uncapped $NaX_{1-y-z}F_4Yb_yZ_z$ nanoparticles, and subsequent decanting of the supernatant; and i-6) dispersing the uncapped $NaX_{1-y-z}F_4Yb_yZ_z$ nanoparticles in an organic solvent selected from the group consisting of a ketone, an alcohol, an ester, and mixtures thereof, followed by centrifugation to form a supernatant and to sediment the uncapped $NaX_{1-y-z}F_4Yb_yZ_z$ nanoparticles, and subsequent decanting of the supernatant to yield the uncapped $NaX_{1-y-z}F_4Yb_yZ_z$ nanoparticles as a slurry (i.e. a suspension of the herein described uncapped $NaX_{1-y-z}F_4Yb_yZ_z$ nanoparticles in the herein described organic solvent); wherein step i-4) and/or step i-6) is preferably conducted at least twice.

In a further preferred embodiment, step i-2) of the manufacturing process comprises stirring the mixture obtained at step i-1) at a temperature of about 120° C. for about two hours to form uncapped $NaX_{1-y-z}F_4Yb_yZ_z$ nanoparticles.

In a preferred embodiment, step i-5) comprises:

heating the uncapped $NaX_{1-y-z}F_4Yb_yZ_z$ nanoparticles for 12 to 24 hours at a temperature of about 80° C. to about 100° C.;

deagglomeration of the uncapped $NaX_{1-y-z}F_4Yb_yZ_z$ nanoparticles;

and optionally subjecting the powder to a heating treatment at a temperature of between 250° C. to about 350° C. for about 1 to 3 hours.

Preferably, the organic solvent used at step i-6) is selected from a ketone as described herein, an alcohol as described herein, and mixtures thereof, and more preferably is selected from methyl-ethyl-ketone (MEK), ethanol, and mixtures thereof.

Another aspect according to the present invention relates to a process for manufacturing a photoluminescent security feature on an article, or a value document, wherein said process comprises the steps:

applying by continuous ink-jet printing the photoluminescent security ink claimed and described on a surface of the article, or of a substrate of the value document so as to form a photoluminescent security ink layer, and drying the photoluminescent security ink layer to provide the photoluminescent security feature.

Conveniently, the photoluminescent security inks claimed herein adhere to both smooth and rough surfaces. Hence, the surface on which the photoluminescent security ink is applied by continuous ink-jet printing does not present any limitation in terms of smoothness/roughness.

The drying step may be any step that increases the viscosity of the ink, such that a substantially solid material adhering to the article/substrate is formed. The drying step may involve a physical process based on the evaporation of a volatile component, such as a solvent (i.e. physical drying). Herein, hot air, infrared or a combination of hot air and infrared may be used.

A further aspect according to the present invention is directed to an article or a value document carrying the photoluminescent security feature obtained by the process claimed and described herein.

The term "security feature" designates an element or a feature on an article or value document for the purpose of determining its authenticity and protecting it against counterfeits and illegal reproduction. The term "security feature" is used to denote an indicium that can be used for authentication purposes. As used herein, the term "indicium" shall mean a continuous or discontinuous layer obtained from the photoluminescent security ink claimed and described herein, wherein said layer consists of distinguishing markings, or signs, or patterns. Preferably, the indicium described herein is selected from the group consisting of codes, symbols, alphanumeric symbols, motifs, geometric patterns (e.g. circles, triangles and regular or irregular polygons), letters, words, numbers, logos, and combinations thereof. Examples of codes include encoded marks, such as an encoded alphanumeric data, a one-dimensional barcode, a two-dimensional barcode, a QR-code, and a datamatrix.

The photoluminescent security feature described herein displays NIR-to-visible up-conversion photoluminescence and/or NIR-to-NIR down-conversion photoluminescence, and constitutes an excellent means for verifying the authenticity of the articles and value documents carrying said photoluminescent security feature.

The term "article" as used herein encompasses all articles that shall be protected against counterfeiting and/or illegal reproduction in order to warrant their content and includes, without limitation, cosmetic articles, nutraceutical articles, pharmaceutical articles, alcoholic and non-alcoholic beverages, tobacco articles, food products, electrical/electronic articles, fabrics, automotive spare products, construction materials, agrochemicals, luxury articles, and jewelry.

The articles can be protected against counterfeiting and/or illegal reproduction by applying a security feature either directly on the article (direct marking), or on the packaging and/or labeling for the article. The security feature may be printed directly on the surface of an article (for e.g.: jewelry, automotive spare products, electrical/electronic articles), or on a surface of a container/recipient of the article to be protected (for e.g.: pharmaceutical articles, food products, agrochemicals, alcoholic and non-alcoholic beverages). The article or the container/recipient enclosing said article may be made of a porous, semi-porous, or non-porous material. The material is preferably selected from glass, metal, ceramics, plastics and polymers, composite materials, wood, leather, fabrics, and combinations thereof. Typical examples of metals include without limitation aluminum, chromium, copper, gold, silver, alloys thereof, and combinations thereof. Typical examples of plastics and polymers include polyolefins, such as polyethylene (PE) and polypropylene (PP), including biaxially oriented polypropylene (BOPP), polyamides, polyesters, such as poly(ethylene terephthalate) (PET), poly(1,4-butylene terephthalate) (PBT), and poly(ethylene 2,6-2,4 naphthoate) (PEN), and polyvinylchlorides (PVC).

The term "value document" refers to a document having a value, such as to render it potentially liable to attempts at counterfeiting or illegal reproduction and which is usually protected against counterfeit or fraud by at least one security feature. Preferably, the value document is selected from banknotes, deeds, tickets, checks, vouchers, fiscal stamps, labels, agreements, identity documents, access documents, and packaging material for cosmetic articles, nutraceutical articles, pharmaceutical articles, alcoholic and non-alcoholic beverages, tobacco articles, food products, electrical/electronic articles, fabrics, automotive spare parts, construction materials, agrochemicals, luxury articles, or jewelry.

The substrate of the value document described herein may be porous, semi-porous, or non-porous, and is preferably selected from papers or other fibrous materials (including woven and non-woven fibrous materials), such as cellulose, paper-containing materials, plastics and polymers, composite materials, and combinations thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP) including biaxially oriented polypropylene (BOPP), polyamides, polyesters, such as poly(ethylene terephthalate) (PET), poly(1,4-butylene terephthalate) (PBT), and poly(ethylene 2,6-2,4 naphthoate) (PEN), and polyvinylchlorides (PVC). Spunbonded olefin fibers, such as those sold under the trademark Tyvek®, may also be used as substrate. Typical examples of composite materials include without limitation multilayer structures or laminates of paper and at least one plastic or polymer material, such as those described hereabove as well as plastic and/or polymer fibers incorporated in a paper-like or fibrous material, such as those described hereabove. Of course, the substrate can comprise further additives that are known to the skilled person, such as fillers, sizing agents, whiteners, processing aids, reinforcing or wet strengthening agents, etc.

EXAMPLES

The present invention is now described in more details with reference to non-limiting examples.

General

Yttrium nitrate $[Y(NO_3)_3nH_2O]$, ytterbium nitrate $[Yb(NO_3)_3nH_2O]$, erbium nitrate $[Er(NO_3)_3nH_2O]$ and terbium nitrate $[Tb(NO_3)_3nH_2O]$ were purchased from Treibacher Industrie. Gadolinium nitrate $[Gd(NO_3)_3nH_2O]$ was purchased from PIDC. Thulium nitrate $[Tm(NO_3)_3nH_2O]$ was purchased from Strem Chemicals. Sodium chloride was purchased from Acros Organics. Ammonium fluoride $(NH_4F)$ was purchased from Merck. Ethylene Glycol (99.5%) was purchased from Brenntag.

Dispersing resins used to prepare the nanoparticles dispersions are listed in Table 1 with their respective supplier and CAS number when available.

All chemicals were used as received.

I. Synthesis of Uncapped $NaX_{1-y-z}F_4Yb_yZ_z$ Nanoparticles

I.1.1 Synthesis of Uncapped $NaYF_4$:$Yb_{0.18}$,$Er_{0.02}$ Nanoparticles (NP1) as a Powder 30.64 g of yttrium nitrate (80 mmol), 8.41 g of ytterbium nitrate (18 mmol), 0.89 g of erbium nitrate (2 mmol), 5.84 g of NaCl (100 mmol) and 500 ml of ethylene glycol (EG) were mixed at room temperature in a three-necked flask. The mixture was stirred under argon with a magnetic stirring bar at 80° C. for 10 min until all the salts were completely dissolved (solution A).

14.81 g of $NH_4F$ (400 mmol) was added to 500 ml of ethylene glycol in a beaker and the mixture was stirred with a magnetic stirring bar at 80° C. for 15 min until $NH_4F$ was completely dissolved (solution B).

The solution B was added to the solution A. After stirring for 10 min under argon at 80° C., the temperature of the mixture was increased to 160° C. and the stirring was continued for 2 hours.

After cooling the mixture to room temperature, the resulting uncapped $NaYF_4$:$Yb_{0.18}$,$Er_{0.02}$ nanoparticles were destabilized by addition of 1000 ml of deionized water. The mixture was centrifuged at 4750 rpm for 10 minutes (Allegra® X-15R centrifuge from BECKMAN COULTER). After centrifugation, the supernatant was removed, and the sedimented nanoparticles were washed with 200 ml deionized water, and isolated by centrifugation at 4750 rpm for 10 minutes, followed by removal of the supernatant. The washing/centrifugation cycle was repeated two times. The final product was dried at 80° C. for 24 h in an oven. Following deagglomeration of the resulting cake with a mortar pestle, the $NaYF_4$:$Yb_{0.18}$,$Er_{0.02}$ powder is heated to 350° C. for 3 h in an oven.

I.1.2 Synthesis of Uncapped $NaYF_4$:$Yb_{0.10}$, $Er_{0.10}$ Nanoparticles (NP2) as a Powder The nanoparticles of $NaYF_4$:$Yb_{0.10}$, $Er_{0.10}$ (NP2) were obtained according to the same method and the same conditions as used for NP1 at item I.1.1, using 30.64 g of yttrium nitrate (80 mmol), 4.67 g of ytterbium nitrate (10 mmol), 4.43 g of erbium nitrate (10 mmol), and the same quantities of NaCl, $NH_4F$ and ethylene glycol as used for the synthesis of the powder of uncapped nanoparticles NP1.

I.1.3 Synthesis of Uncapped $NaYF_4$:$Yb_{0.35}$,$Tm_{0.01}$ Nanoparticles (NP3) as a Powder The nanoparticles of $NaYF_4$:$Yb_{0.35}$,$Tm_{0.01}$ (NP3) were obtained according to the same method and the same conditions as used for NP1 at item I.1.1, using 24.51 g of yttrium nitrate (64 mmol), 16.35 g of ytterbium nitrate (35 mmol), 0.46 g of thulium nitrate (1 mmol), and the same quantities of NaCl, $NH_4F$ and ethylene glycol as used for the synthesis of the powder of uncapped nanoparticles NP1.

I.1.4 Alternative Synthesis of Uncapped $NaYF_4$:$Yb_{0.18}$, $Er_{0.02}$ Nanoparticles (NP1) as a Powder 30.64 g of yttrium nitrate (80 mmol), 8.41 g of ytterbium nitrate (18 mmol), 0.89 g of erbium nitrate (2 mmol), 5.84 g of NaCl (100 mmol) and 500 ml of ethylene glycol (EG) were mixed at room temperature in a three-necked flask. The mixture was stirred under argon with a magnetic stirring bar at 80° C. for 10 min until all the salts were completely dissolved (solution A).

14.81 g of $NH_4F$ (400 mmol) was added to 500 ml of ethylene glycol in a beaker and the mixture was stirred with a magnetic stirring bar at 80° C. for 15 min until $NH_4F$ was completely dissolved (solution B).

The solution B was added to the solution A. After stirring for 10 min under argon at 80° C., the temperature of the mixture was increased to 120° C. and the stirring was continued for 4 hours.

After cooling the mixture to room temperature, the resulting $NaYF_4$:$Yb_{0.18}$,$Er_{0.02}$ nanoparticles were destabilized by addition of 1000 ml of deionized water. The mixture was centrifuged at 4750 rpm for 10 minutes (Allegra® X-15R centrifuge from BECKMAN COULTER). After centrifugation, the supernatant was removed, and the sedimented nanoparticles were washed with 200 ml deionized water, and isolated by centrifugation at 4750 rpm for 10 minutes, followed by removal of the supernatant. The washing/centrifugation cycle was repeated two times. The final product was dried at 80° C. for 24 h in an oven. Following the deagglomeration of the resulting cake with a mortar pestle, the $NaYF_4$:$Yb_{0.18}$,$Er_{0.02}$ powder is heated to 350° C. for 3 h in an oven.

I.1.5 Synthesis of Uncapped $NaGdF_4$:$Yb_{0.18}$,$Er_{0.02}$ Nanoparticles (NP4) as a Powder 36.12 g of gadolinium nitrate (80 mmol), 8.41 g of ytterbium nitrate (18 mmol), 0.89 g of erbium nitrate (2 mmol), 5.84 g of NaCl (100 mmol) and 500 ml of ethylene glycol (EG) were mixed at room temperature in a three-necked flask. The mixture was stirred under argon with a magnetic stirring bar at 80° C. for 10 min until all the salts were completely dissolved (solution A). 14.81 g of $NH_4F$ (400 mmol) was added to 500 ml of ethylene glycol in a beaker and the mixture was stirred with a magnetic stirring bar at 80° C. for 15 min until $NH_4F$ was completely dissolved (solution B).

The solution B was added to the solution A. After stirring for 10 min under argon at 80° C., the temperature of the mixture was increased to 160° C. and the stirring was continued for 2 hours.

After cooling down the mixture to room temperature, the resulting $NaGdF_4$:$Yb_{0.18}$,$Er_{0.02}$ nanoparticles were destabilized by addition of 1000 ml of deionized water. The mixture was centrifuged at 4750 rpm for 10 minutes (Allegra® X-15R centrifuge from BECKMAN COULTER). After centrifugation, the supernatant was removed, and the sedimented nanoparticles were washed with 200 ml deionized water, and isolated by centrifugation at 4750 rpm for 10 minutes, followed by removal of the supernatant. The washing/centrifugation cycle was repeated two times. The final product was dried at 80° C. for 24 h in an oven. Following deagglomeration of the resulting cake with a mortar pestle, the $NaGdF_4$:$Yb_{0.18}$,$Er_{0.02}$ powder is heated to 350° C. for 3 h in an oven.

I.2.1 Synthesis of Uncapped $NaYF_4$:$Yb_{0.18}$,$Er_{0.02}$ Nanoparticles (NP1) as a Slurry in Ethanol 30.64 g of yttrium nitrate (80 mmol), 8.41 g of ytterbium nitrate (18 mmol), 0.89 g of erbium nitrate (2 mmol), 5.84 g of NaCl (100 mmol) and 500 ml of ethylene glycol (EG) were mixed at room temperature in a three-necked flask. The mixture was stirred under argon with a magnetic stirring bar at 80° C. for 10 min until all the salts were completely dissolved (solution A).

14.81 g of $NH_4F$ (400 mmol) was added to 500 ml of ethylene glycol in a beaker and the mixture was stirred with a magnetic stirring bar at 80° C. for 15 min until $NH_4F$ was completely dissolved (solution B).

The solution B was added to the solution A. After stirring for 10 min under Ar at 80° C., the temperature of the mixture was increased to 160° C. and the stirring was continued for 2 hours.

After cooling the mixture to room temperature, the resulting $NaYF_4$:$Yb_{0.18}$,$Er_{0.02}$ nanoparticles were destabilized by addition of 1000 ml of deionized water. The mixture was centrifuged at 4750 rpm for 10 minutes (Allegra® X-15R centrifuge from BECKMAN COULTER). After centrifugation, the supernatant was removed, and the sedimented nanoparticles were washed with 200 ml deionized water, and isolated by centrifugation at 4750 rpm for 10 minutes, followed by removal of the supernatant. The washing/centrifugation cycle was repeated two times. The wet nanoparticles synthesized were re-dispersed in EtOH and centrifuged at 4750 rpm for 10 minutes (Allegra® X-15R centrifuge from BECKMAN COULTER). After centrifugation, the supernatant was removed and the wet nanoparticles were subjected to two further washing/centrifugation cycles with EtOH. Following decanting of the supernatant, the uncapped $NaYF_4$:$Yb_{0.18}$,$Er_{0.02}$ nanoparticles were obtained as a slurry in ethanol. The slurry can be used as an alternative to the powder for producing the dispersions and the inks described herein.

I.2.2 Synthesis of Uncapped $NaYF_4$:$Yb_{0.18}$,$Er_{0.02}$ Nanoparticles (NP1) as a Slurry in Methyl-Ethyl-Ketone 30.64 g of yttrium nitrate (80 mmol), 8.41 g of ytterbium nitrate (18 mmol), 0.89 g of erbium nitrate (2 mmol), 5.84 g of NaCl (100 mmol) and 500 ml of ethylene glycol (EG)

were mixed at room temperature in a three-necked flask. The mixture was stirred under argon with a magnetic stirring bar at 80° C. for 10 min until all the salts were completely dissolved (solution A).

14.81 g of $NH_4F$ (400 mmol) was added to 500 ml of ethylene glycol in a beaker and the mixture was stirred with a magnetic stirring bar at 80° C. for 15 min until $NH_4F$ was completely dissolved (solution B).

The solution B was added to the solution A. After stirring for 10 min under Ar at 80° C., the temperature of the mixture was increased to 160° C. and the stirring was continued for 2 hours.

After cooling the mixture to room temperature, the resulting $NaYF_4$:$Yb_{0.18}$,$Er_{0.02}$ nanoparticles were destabilized by the addition of 1000 ml of deionized water. The mixture was centrifuged at 4750 rpm for 10 minutes (Allegra® X-15R centrifuge from BECKMAN COULTER). After centrifugation, the supernatant was removed, and the sedimented nanoparticles were washed with 200 ml deionized water, and isolated by centrifugation at 4750 rpm for 10 minutes, followed by removal of the supernatant. The washing/centrifugation cycle was repeated two times. The wet nanoparticles synthesized were re-dispersed in methyl-ethyl-ketone (MEK) and centrifuged at 4750 rpm for 10 minutes (Allegra® X-15R centrifuge from BECKMAN COULTER). After centrifugation, the supernatant was removed and the wet nanoparticles were subjected to two further washing/centrifugation cycles with MEK. Following decanting of the supernatant, the uncapped $NaYF_4$:$Yb_{0.18}$,$Er_{0.02}$ nanoparticles were obtained as a slurry in MEK. The slurry can be used as an alternative to the powder for producing the dispersions and the inks described herein.

II. Characterization of the Nanoparticles

The size, the shape and the chemical composition of the nanoparticles NP1-NP4 were characterized using a Scan Electron microscope (EVO HD15 from ZEISS) equipped with two detectors, namely a) a SE detector (Secondary Electron detector Everhart-Thornley from ZEISS) for the surface analysis and topography; and b) an EDS detector (Energy Dispersive Spectroscopy; X-Max® 50 SDD X-ray from Oxford Instruments) for the micro-analysis and chemical elementary analysis.

Figure 1B:
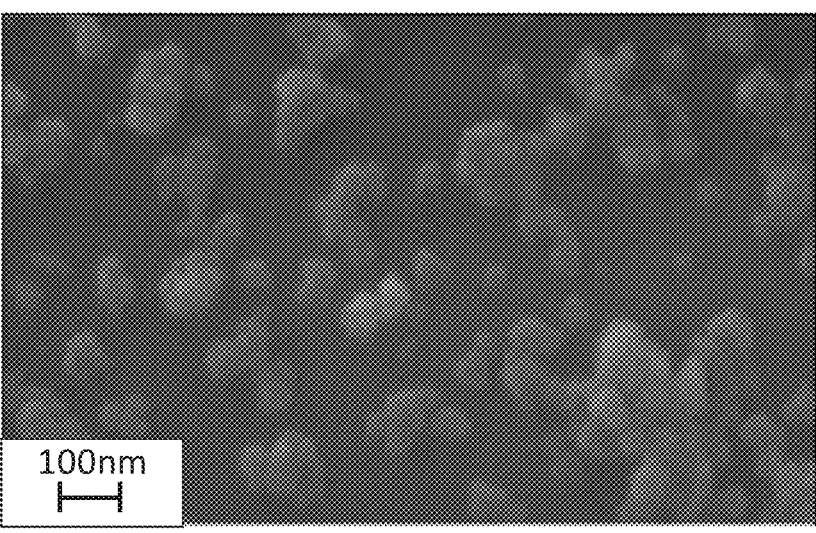
FIG. 1b shows a SEM image of the uncapped $NaYF_4$: $Yb_{0.18},Er_{0.02}$ nanoparticles (NP1) according to the present invention taken at 200 kx magnification.

The diameter of the nanoparticles was measured on SEM images (program SMART SEM from Zeiss). FIG. 1a-b) show SEM images of the uncapped nanoparticles NP1 obtained as described at item I.1.1 taken at the magnification 100k× (FIG. 1a) and 200k× (FIG. 1b), respectively. The uncapped nanoparticles NP1 have a mean diameter of about 48 nm. The mean diameter was determined using a SEM image taken at 200k× magnification on the basis of the diameter measured for 100 randomly selected uncapped nanoparticles NP1, with the diameter of an uncapped nanoparticle NP1 corresponding to the maximum dimension of said uncapped nanoparticle as detectable in the scanning electron microscopy (SEM) image.

The uncapped nanoparticles NP2-NP4 have a mean diameter of between 30 nm and 70 nm, with the mean diameter being based on the diameter measured for at least 100 randomly selected uncapped nanoparticles, wherein the diameter of an uncapped nanoparticle corresponds to the maximum dimension of said uncapped nanoparticle as detectable in a scanning electron microscopy (SEM) image.

XRF analysis and comparison with reference spectra (Ding et al. Nature (2015), 5, 12745) showed that the nanoparticles adopted the cubic phase a-$NaYF_4$.

III. Preparation of Inks Containing the Uncapped Nanoparticles

Prior to the preparation of the photoluminescent security ink claimed herein, the compatibility between a variety of dispersing resins and the uncapped nanoparticles NP1 was studied. Hence, dispersions D0, D1-D14 were prepared according to the procedure described below. The quality and stability following centrifugation of said dispersion were visually evaluated. The stability over time of said dispersions was evaluated by dynamic light scattering. Only dispersions that showed good quality and good to medium stability in the tests described below are suitable to be used for producing photoluminescent security inks that comply with the shelf-life requirements imposed in industrial printing of security features.

III.1.1 Preparation of Dispersions D1-D14 Containing the Uncapped Nanoparticles NP1 and a Dispersing Agent, and of the Dispersing Agent Free Dispersion D0

10 g of each of the dispersions D1-D14 having the composition shown in Table 2 were prepared by dispersing for 10 min with an ultrasound horn (UP400S, 400 W, 24 kHz, Cycle of 0.5 sec, Amplitude 100%, equipped with a sonotrode H3 (3 mm) (Hielscher Ultrasonics Gmb) a powder of uncapped nanoparticles NP1 obtained as described at item I.1.1 in a solution containing a dispersing resin R1-R14 (Table 1) in methyl ethyl ketone (MEK).

Table 1 lists the dispersing resins that were used for the preparation of the dispersions D1-D14.

10 g of dispersion D0 having the composition shown in Table 2 were prepared by dispersing for 10 min with an ultrasound horn (UP400S, 400 W, 24 kHz, Cycle of 0.5 sec, Amplitude 100%, equipped with a sonotrode H3 (3 mm) (Hielscher Ultrasonics Gmb) a powder of uncapped nanoparticles NP1 obtained as described at item I.1.1 in methyl ethyl ketone (MEK). 10

TABLE 1

| | Dispersing resins used for the preparation of the dispersions D1-D14 | | |
|---|---|---|---|
| | Commercial Name | Supplier CAS | Chemical nature of resin CAS Nr |
| R1 | S-LEC ® B BL 10 | Sekisui Chemical Co., Ltd. | Polyvinyl butyral resin (CAS Nr 63148-65-2) |
| R2 | Vinnol ® E15/40 A | Wacker | 2-Hydroxypropyl acrylate-vinyl chloride copolymer (CAS Nr 53710-52-4) |

TABLE 1-continued

| | Commercial Name | Supplier CAS | Chemical nature of resin CAS Nr |
|---|---|---|---|
| R3 | Surkofilm ® 72S | BIP (Oldbury) Limited | Poylurethane |
| R4 | WALSRODER ™ NC-Chips A 400 ATBC 20% | Dupont | Nitrocellulose |
| R5 | Ethocel ™ Standard 7 | Dupont | Cellulose ethyl ether (CAS Nr 9004-57-3) |
| R6 | Paraloid ™ B-82 | Dow Chemical Company | Alkyl acrylate alkyl methacrylate copolymer |
| R7 | CAB-551-0.01 | Eastman | Cellulose acetate butanoate (CAS Nr 9004-36-8) |
| R8 | Tego ® Variplus TC | Evonik | Ketone-aldehyde condensation resin |
| R9 | Tego ® Variplus CA | Evonik | Ketone-aldehyde condensation resin |
| R10 | Pentalyn ™ H-E | Eastman | Ester of hydrogenated rosin |
| R11 | Joncryl ® HPD 671 | BASF | Styrene-acrylic polymer |
| R12 | DYNAPOL ® L411 | Evonik | Saturated copolyester |
| R13 | VINNOL ® E18/38 | Wacker | Copolymer of approx. 82 wt. % vinyl-chloride and approx. 18 wt. % vinyl-acetate (CAS Nr 9003-22-9) |
| R14 | VINNOL ® E15/45M | Wacker | Carboxylate-containing terpolymer of approx. 84 wt. % vinyl chloride, approx. 15 wt. % vinyl acetate and approx. 1 wt. % dicarboxylic acid (CAS Nr. 28086-69-3) |

Dispersing resins used for the preparation of the dispersions D1-D14

III.1.2 Assessment of the Quality and Stability of the Dispersions DO, D1-D14

III.1.2.1 Assessment of the Quality of the Dispersions D0, and D1-D14 by Visual Inspection The quality of the dispersions D0, D1-D14 was evaluated by visually inspecting the appearance of the dispersion once the sonication step was completed (t=t0). The results of the visual inspection summarized in Table 2 were classified as follows:

G=good quality: the dispersion has a translucent appearance of constant intensity throughout the dispersing resin solution, which indicates that the uncapped nanoparticles are homogeneously dispersed throughout the dispersing resin solution, and the dispersion has a good quality at t0;

M=medium quality: the dispersion has a translucent appearance with an intensity gradient from the top to the bottom of the tube containing the dispersion, which indicates that the uncapped nanoparticles are not entirely homogenously dispersed throughout the dispersing resin solution, and the dispersion has a medium quality at t0;

P=poor quality: the dispersion has a clear appearance at the top of the tube containing the dispersion and sedimentation of the uncapped nanoparticles is noticed, which is indicative of a poor or no dispersion of the uncapped nanoparticles in the dispersing resin solution and of a dispersion of poor quality at t0.

III. 1.2.2 Assessment of the Stability of the Dispersions D0, and D1-D14 by Visual Inspection Subsequently, the samples were centrifuged (Allegra® X-15R centrifuge from BECKMAN COULTER) for 10 min at 4750 rpm). Once the centrifugation step was completed (t1), the stability of the dispersion was assessed by visually inspecting the appearance of the supernatant. The results of the visual inspection summarized in Table 2 were classified as follows:

G=good stability: the supernatant has a translucent appearance of constant intensity throughout the dispersing resin solution, which indicates that the uncapped nanoparticles are homogeneously dispersed throughout the dispersing resin solution, and the dispersion has a good stability;

M=medium stability: the supernatant has a translucent appearance with an intensity gradient from the top to the bottom of the tube containing the dispersion, which indicates that the uncapped nanoparticles are not entirely homogenously dispersed throughout the dispersing resin solution, and the dispersion has a medium stability;

P=poor stability: the supernatant had a clear appearance and sedimentation of the uncapped nanoparticles is noticed, which is indicative of the absence of the uncapped nanoparticles, and of an unstable dispersion at t1.

Table 2 summarizes the results obtained via the visual assessment of the dispersions at t0 and t1. As shown in Table 2, resin containing dispersions D11 and D12, as well as resin-free dispersion D0, show poor quality at t0, which is further deteriorated following centrifugation. Moreover, resin containing dispersions D8-D10 although showing good quality at to, are kinetically unstable as indicated by the results obtained via visual inspection following centrifugation. Dispersions having poor quality, or being evaluated as kinetically unstable in the test described above are not suitable for preparing CIJ inks that comply with the shelf-life requirements imposed in industrial printing of security features. Surprisingly, dispersions D1-D7 and D13-D14 showed good quality at to, and medium to good kinetic stability in the test described above.

Comparable results were obtained with dispersions prepared starting from slurries of uncapped nanoparticles NP1 in EtOH or MEK manufactured as described at item 1.2.1 and 1.2.2, respectively instead of the powder of uncapped nanoparticles NP1.

III.1.2.3 Assessment of the Stability Over Time of the Dispersions D1-D7 and D13-D14

The stability over time of the dispersions D1-D7 and D13-D14 was assessed using the procedure described below.

Following centrifugation (t1) and one month after centrifugation (t2), 50 mg of the supernatant of each of the dispersions D1-D7 and D13-D14 was individually diluted with MEK (450 mg) so as to obtain a diluted sample that was analyzed immediately by dynamic light scattering (DLS) using a Zetasizer Nano ZS (from Malvern) to determine the mean particles size ($Z_{av}$) and the polydispersity index (PDI) of the dispersed nanoparticles. In between t1 and t2, the dispersions were stored in the dark at room temperature. Each measurement was repeated three times.

The mean particle size variation ($\Delta Z_{av}$) between the average value determined for the mean particles size ($Z_{av}$) at t2 and the average value determined for the mean particles size ($Z_{av}$) at t1 was calculated and classified as follows:

I: no or insignificant variation of the mean particles size ($Z_{av}$) between t2 and t1 corresponding to a difference in absolute value between the average value determined for the mean particles size ($Z_{av}$) at t2 and the average value determined for the mean particles size ($Z_{av}$) at t1 lower than 10 nm;

M: medium variation of the mean particles size ($Z_{av}$) between t2 and t1 corresponding to a difference in absolute value between the average value determined for the mean particles size ($Z_{av}$) at t2 and the average value determined for the mean particles size ($Z_{av}$) at t1 higher than or equal to 10 nm and lower than 20 nm;

H: high variation of the mean particles size ($Z_{av}$) between t2 and t1 corresponding to a difference in absolute value between the average value determined for the mean particles size ($Z_{av}$) at t2 and the average value determined for the mean particles size ($Z_{av}$) at t1 higher than or equal to 20 nm. The results are summarized in Table 2.

The polydispersity index variation ($\Delta$PDI) between the average value determined for the polydispersity index (PDI) at t2 and the average value determined for the polydispersity index (PDI) at t1 was calculated and classified as follows:

I: no or insignificant variation of the polydispersity index (PDI) between t2 and t1 corresponding to a difference in absolute value between the average value determined for the mean polydispersity index (PDI) at t2 and the average value determined for the mean polydispersity index (PDI) at t1 lower than 0.05 units;

M: medium variation of the polydispersity index (PDI) between t2 and t1 corresponding to a difference in absolute value between the average value determined for the mean polydispersity index (PDI) at t2 and the average value determined for the mean polydispersity index (PDI) at t1 higher than or equal to 0.05 units and lower than 0.1 units;

H: high variation of the polydispersity index (PDI) between t2 and t1 corresponding to a difference in absolute value between the average value determined for the mean polydispersity index (PDI) at t2 and the average value determined for the mean polydispersity index (PDI) at t1 higher than or equal to 0.1 units. The results are summarized in Table 2.

An insignificant variation of the mean particles size ($Z_{av}$) between t2 and t1 and of the polydispersity index (PDI) between t2 and t1 is indicative for a good stability over time of the dispersion.

As illustrated in Table 2, the dispersions D1-D4, D6-D7 and D13-D14 showed good stability over time as indicated by the insignificant variation of the mean particles size and of the polydispersity index between t2 and t1. On the contrary, dispersion D5 did not prove stable over time as indicated by the high variation of the mean particles size and of the polydispersity index between t2 and t1, and consequently is not suitable to be used for preparing photoluminescent security inks for CIJ printing that comply with the shelf-life requirements of industrial printing of security features.

TABLE 2

| | | | | | | | | | Evaluation of the properties of the dispersion D0-D14 | | | | | |
|---|---|---|---|---|---|---|---|---|---|---|---|---|---|---|
| | D0 | D1 | D2 | D3 | D4 | D5 | D6 | D7 | D8 | D9 | D10 | D11 | D12 | D13 | D14 |
| NP1 [wt %] | 5 | 5 | 5 | 5 | 5 | 5 | 5 | 5 | 5 | 5 | 5 | 5 | 5 | 5 | 5 |
| Resin | — | R1 | R2 | R3 | R4 | R5 | R6 | R7 | R8 | R9 | R10 | R11 | R12 | R13 | R14 |
| (Table 1) [wt %] | | 9 | 9.5 | 10 | 5 | 2 | 5 | 2 | 5 | 5 | 5 | 3 | 3 | 5 | 4 |
| MEK [wt %] | 95 | 86 | 85.5 | 85 | 90 | 93 | 90 | 93 | 90 | 90 | 90 | 92 | 92 | 90 | 91 |
| Dispersion quality at t0[1] | P | G | G | G | G | G | G | G | G | G | G | P | P | G | G |
| Dispersion stability at t1[2] | P | G | G | G | G | G | M | M | P | P | P | P | P | G | G |
| $\Delta$Zav[3] | n.d. | I | I | I | I | H | I | I | n.d. | n.d. | n.d.— | n.d. | n.d. | I | I |
| $\Delta$PDI[4] | n.d. | I | I | I | I | H | I | I | n.d. | n.d. | n.d. | n.d. | n.d. | I | I |

[1]Dispersion quality at t0 as evaluated by visual inspection of the dispersion following the sonication step: G = good quality; M = medium quality; P = poor quality;
[2]Dispersion stability at t1 as evaluated by visual inspection of the supernatant following the centrifugation step: G = good stability; M = medium stability; P = poor stability or unstable dispersion;
[3]Mean particles size variation ($\Delta Z_{av}$) between the average value determined for the mean particles size ($Z_{av}$) at t2 and the average value determined for the mean particles size ($Z_{av}$) at t1 ($\Delta Z_{av}$) as determined by dynamic light scattering: I: no or insignificant variation of the mean particles size ($Z_{av}$); M: medium variation of the mean particles size ($Z_{av}$); H: high variation of the mean particles size ($Z_{av}$);I
[4]Polydispersity index variation ($\Delta$PDI) between the average value determined for the polydispersity index (PDI) at t2 and the average value determined for the polydispersity index (PDI) at t1 as determined by dynamic light scattering: I: no or insignificant variation of the polydispersity index (PDI); M: medium variation of the polydispersity index (PDI); H: high variation of the polydispersity index (PDI).

III.2.1 Preparation of CIJ Security Inks E-I1 to E-I11

400 g of each of the dispersions D1-D4, D6-D7, and D13-D14 having the composition shown in Table 2 were prepared as described at item III.1.1. Continuous ink-jet security inks E-I1-E-I11 having the composition shown in Table 3 were prepared by stirring in a beaker with a magnetic stirring bar at room temperature for about 1 hour individually each of the dispersions D1-D4, D6-D7, and D13-D14 with the components listed in Table 3. The continuous ink-jet inks E-I1-E-I11 were filtered with Nylon membrane filter 5 μm (Titan 3 from Thermo Fisher Scientific).

III.2.2 Assessment of the Print Quality and CIJ Security Ink Stability

The CIJ security inks of Table 3 were printed on a paper substrate (white paper N2C-2 from Leneta) as a 6 mm×12 mm rectangle, using a continuous inkjet printer (A200 from Domino Printing Sciences, UK) immediately after their preparation (t0) and one month later (t1) to provide a photoluminescent ink layer that following solvent evaporation furnished the corresponding photoluminescent security features. The inks were stored at room temperature in the dark between the two printing trials.

The viscosity of the inks at to was measured at 25° C. using a Brookfield viscometer (model LV (low viscosity)) equipped with a spindle 00 at 60 rpm. The results are summarized in Table 3.

The print quality was evaluated by inspecting with the naked eye the photoluminescent security features produced as described above. The results of the visual assessment are summarized in Table 3 and were classified as follows:

G=good print quality corresponding to a perfect dot placement and an optimal print;

M=medium print quality corresponding to a slight dot misplacement and a negligible print distortion;

P=poor print quality corresponding to a strong dot misplacement and heavy print distortion.

Figure 2:
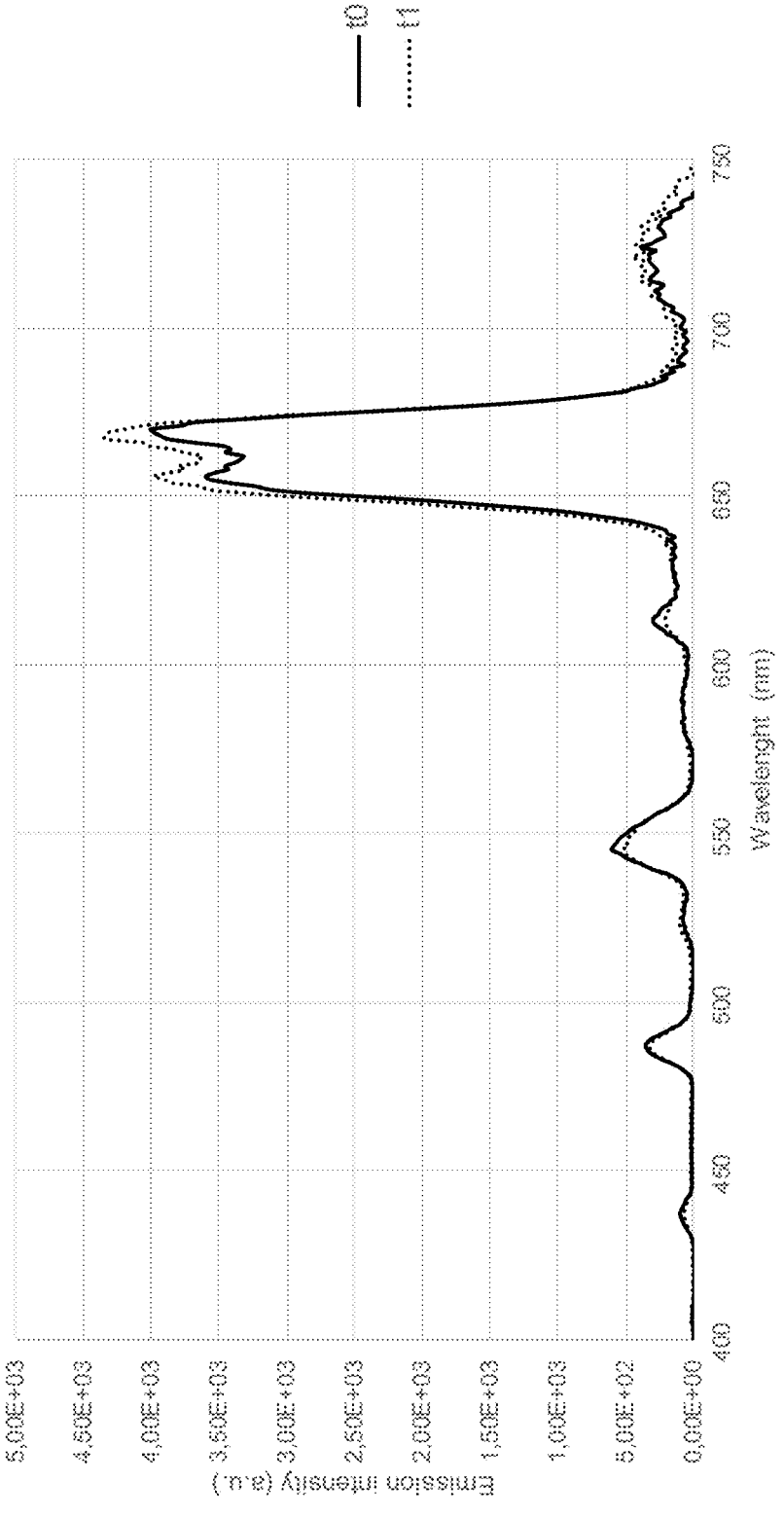
FIG. 2 shows the superimposed photoluminescence emission spectra of security features obtained with a continuous ink-jet security ink according to the present invention (security feature obtained with ink E-I4) directly after the preparation of the continuous ink-jet security ink (spectrum at t0) and one month after the preparation of said ink (spectrum at t1), respectively: x-axis—emission wavelength, y-axis—photoluminescence signal intensity.

The photoluminescence signals of security features obtained at t0 and t1 as described above with the CIJ security inks of Table 3 were measured using a Fluorolog®-3 spectrophotometer (900 nm filter; band pass 8 nm) (from HORIBA SCIENTIFIC) equipped with a photomultiplier tube R928P (from HAMMATSU) after excitation at 970 nm to assess the inks stability over one month. FIG. 2 illustrates the superimposed photoluminescence emission spectra registered for the security features obtained with ink E-I4 at t0 and t1, respectively. The average intensity of the photoluminescence signal exhibited by the security feature between 630 nm and 690 nm was calculated. The variation of the average intensity of the photoluminescence signal between t0 and t1 gives an indication of the shelf-life ink stability. The results of the photoluminescence measurement are summarized in Table 3 and were classified as follows:

G=good ink stability corresponding to a variation of the average intensity of the photoluminescence signal between t0 and t1 lower than or equal to 10%;

M=medium ink stability corresponding to a variation of the average intensity of the photoluminescence signal between t0 and t1 higher than 10% and lower than or equal to 30%;

P=poor ink stability corresponding to a variation of the average intensity of the photoluminescence signal between t0 and t1 higher than 30%.

As shown in Table 3, inks E-I1, E-I2, E-I5, E-I7, E-I9, and EI11 show good print quality both at t0 and t1 and have a good stability over shelf-life. Such inks are particularly useful for producing security features for articles and value documents that are authenticated by detecting the presence and quantification of the uncapped nanoparticles present in the security feature. Such articles include electrical/electronic articles, automotive spare products, luxury articles, and jewelry. Such value documents include banknotes, deeds, tickets, checks, vouchers, fiscal stamps, labels, agreements, identity documents, access documents, and packaging material for electrical/electronic articles, fabrics, automotive spare parts, construction materials, agrochemicals, luxury articles or jewelry. The print quality and the stability of the inks is not affected by the presence of a colorant in the ink. Inks E-I3, E-I4, E-I6, E-I8 and E-I10 show medium print quality and medium to good ink stability over shelf-life. Such inks are particularly useful for producing security features for articles such as cosmetic articles, nutraceutical articles, pharmaceutical articles, alcoholic and non-alcoholic beverages, tobacco articles, and food products, for which the simple detection of the presence of the uncapped nanoparticles in the security feature is sufficient for authentication purposes.

TABLE 3

| | | | | | | | Continuous ink-jet security inks | | | | | |
| | | E-I1 | E-I2 | E-I3 | E-I4 | E-I5 | E-I6 | E-I7 | E-I8 | E-I9 | E-I10 | E-I11 |
|---|---|---|---|---|---|---|---|---|---|---|---|---|
| Condensed Ink compositions | Dispersion | D1 | D2 | D3 | D4 | D6 | D7 | D2 | D3 | D2 | D13 | D14 |
| | [wt %] | 99.5 | 99 | 96.5 | 95.5 | 93.5 | 93 | 98.8 | 98.3 | 99.3 | 98.9 | 98.9 |
| | Rheology modifier [wt %] | — | R2 0.5 | R2 3 | R2 4 | R2 6 | R2 6.5 | R2 0.5 | R5 1.2 | R5 0.2 | R5 0.6 | R5 0.6 |
| | Lithium perchlorate [wt %] | 0.5 | 0.5 | 0.5 | 0.5 | 0.5 | 0.5 | 0.5 | 0.5 | 0.5 | 0.5 | 0.5 |
| | Solvent Red 124 [wt %] | — | — | — | — | — | — | 0.2 | — | — | — | — |
| | | 100 | 100 | 100 | 100 | 100 | 100 | 100 | 100 | 100 | 100 | 100 |
| Developed Ink compositions | NP1 | 4.975 | 4.95 | 4.83 | 4.78 | 4.68 | 4.65 | 4.94 | 4.92 | 4.97 | 4.95 | 4.95 |
| | Lithium perchlorate | 0.5 | 0.5 | 0.5 | 0.5 | 0.5 | 0.5 | 0.5 | 0.5 | 0.5 | 0.5 | 0.5 |
| | Solvent Red 124 Savinyl Fire Red 3GLS (Clariant) | — | — | — | — | — | — | 0.2 | — | — | — | — |

TABLE 3-continued

| | | | | | | Continuous ink-jet security inks | | | | | |
| --- | --- | --- | --- | --- | --- | --- | --- | --- | --- | --- | --- |
| | E-I1 | E-I2 | E-I3 | E-I4 | E-I5 | E-I6 | E-I7 | E-I8 | E-I9 | E-I10 | E-I11 |
| MEK | 85.57 | 84.65 | 82.02 | 85.94 | 84.14 | 86.49 | 84.49 | 83.55 | 84.9 | 89.0 | 89.99 |
| R1 | 8.955 | — | — | — | — | — | — | — | — | | |
| R2 | — | 9.9 | 3 | 4 | 6 | 6.5 | 9.87 | — | 9.43 | | |
| R3 | — | — | 9.65 | — | — | — | — | 9.83 | — | | |
| R4 | — | — | — | 4.78 | — | — | — | — | — | | |
| R5 | — | — | — | — | — | — | — | 1.2 | 0.2 | 0.6 | 0.6 |
| R6 | — | — | — | — | 4.68 | — | — | — | | | |
| R7 | — | — | — | — | — | 1.86 | — | — | | | |
| R13 | | | | | | | | | | 4.95 | |
| R14 | | | | | | | | | | | 3.96 |
| Print Quality at $t_0$ [1] | G | G | M | M | G | M | G | M | G | M | G |
| Print Quality at $t_1$ [1] | G | G | M | M | G | M | G | M | G | M | G |
| Ink stability [2] | G | G | M | G | G | M | G | M | G | M | G |
| Viscosity at 25° C. (mPas) [3] | 3.05 | 3.30 | 1.69 | 3.18 | 3.55 | 2.20 | 3.35 | 3.95 | 4.42 | 2.52 | 2.67 |

[1] The print quality as evaluated by visual inspection of the photoluminescent security features obtained at $t_0$ (immediately after preparation of the inks) and at $t_1$ (one month after preparation of the inks), respectively: G = good print quality; M = medium print quality; P = poor print quality.
[2] Ink composition stability as evaluated by determining the variation of the average intensity of the photoluminescence signal between t0 and t1: G = good ink stability; M = medium ink stability; P = poor ink stability.
[3] Viscosity (mPas) of the ink composition as measured at $t_0$.

The invention claimed is:

1. A photoluminescent security ink for continuous ink-jet printing, wherein said ink has a viscosity of about 1.5 mPas to about 6 mPas at 25° C., and comprises:
   a) from about 1 wt-% to about 6 wt-% of uncapped $NaX_{1-y-z}F_4Yb_yZ_z$ nanoparticles wherein
   X is selected from the group consisting of $Y^{3+}$ and $Gd^{3+}$;
   Z is selected from the group consisting of $Er^{3+}$, $Tm^{3+}$ and $Ho^{3+}$;

$0 < y+z \leq 0.4$;

and $0 \leq z \leq 0.1$, and wherein the uncapped $NaX_{1-y-z}F_4Yb_yZ_z$ nanoparticles have a mean diameter of between about 30 nm to about 70 nm as measured by scanning electron microscopy;
   b) from about 1.5 wt-% to about 10 wt-% of a dispersing agent selected from the group consisting of a polyvinyl acetal resin, a vinyl chloride copolymer containing from about 60 wt-% to about 95 wt-% of vinyl chloride, a polyurethane resin, a nitrocellulose resin, an ester cellulose resin, an alkyl (meth)acrylate polymer, and mixtures thereof;
   c) from about 80 wt-% to about 90 wt-% of an organic solvent selected from the group consisting of a ketone, an alcohol, an ester, and mixtures thereof; and
   d) from about 0.1 wt-% to about 1 wt-% of a conductive salt,
wherein the weight percents are based on the total weight of the photoluminescent security ink.

2. The photoluminescent security ink according to claim 1, wherein $0.1 \leq y \leq 0.35$.

3. The photoluminescent security ink according to claim 2, wherein Z represents $Er^{3+}$, $0.01 \leq z \leq 0.1$, and $y \geq z$.

4. The photoluminescent security ink according to claim 2, wherein Z represents $Tm^{3+}$, $0.01 \leq z \leq 0.05$, and $y \geq z$.

5. The photoluminescent security ink according to claim 1, wherein X represents $Y^{3+}$.

6. The photoluminescent security ink according to claim 1, further comprising:
   e) up to 7 wt-% of a rheology modifier selected from the group consisting of a polyvinyl chloride copolymer containing from about 60 wt-% to about 95 wt-% of vinyl chloride, a cellulose resin, and mixtures thereof, wherein the weight percents are based on the total weight of the photoluminescent security ink.

7. The photoluminescent security ink according to claim 1, wherein the dispersing agent is selected from the group consisting of a polyvinyl acetal resin, a vinyl chloride copolymer containing from about 60 wt-% to about 95 wt-% of vinyl chloride, an alkyl (meth)acrylate polymer, and mixtures thereof and is present in the photoluminescent inkjet security ink in an amount from about 4 wt-% to about 10 wt-%, the weight percents being based on the total weight of the photoluminescent security ink.

8. A process for producing the photoluminescent security ink for continuous ink-jet printing according to claim 1, comprising the steps:
   i) providing uncapped $NaX_{1-y-z}F_4Yb_yZ_z$ nanoparticles either as a powder, or as a slurry, wherein X, Z, y and z have the meanings as defined in claim 1, and wherein the uncapped $NaX_{1-y-z}F_4Yb_yZ_z$ nanoparticles have a mean diameter of between about 30 nm to about 70 nm as measured by scanning electron microscopy;
   ii) providing a solution of a dispersing agent in an organic solvent, wherein the dispersing agent is selected from the group consisting of a polyvinyl acetal resin, a vinyl chloride copolymer containing from about 60 wt-% to about 95 wt-% of vinyl chloride, a polyurethane resin, a nitrocellulose resin, an ester cellulose resin, an alkyl (meth)acrylate polymer, and mixtures thereof; and the organic solvent is selected from the group consisting of a ketone, an alcohol, an ester, and mixtures thereof;
   iii) dispersing the uncapped $NaX_{1-y-z}F_4Yb_yZ_z$ nanoparticles in the solution provided at step ii) to obtain a dispersion; and
   iv) adding to the dispersion obtained at step iii)
   a conductive salt, from about 0.1 wt-% to about 1 wt-% based on the total weight of the photoluminescent security ink,
   optionally an organic solvent selected from the group consisting of a ketone, an alcohol, an ester, and mixtures thereof,
   optionally up to 7 wt-% based on the total weight of the photoluminescent security ink, of a rheology modifier selected from the group consisting of a polyvinyl chloride copolymer containing from about 60 wt-% to about 95 wt-% of vinyl chloride, a cellulose resin, and mixtures thereof, and optionally a colorant to provide the photoluminescent security ink for continuous ink-jet printing.

9. The process according to claim 8, wherein step i) comprises the following steps conducted in the order i-1) to i-3):

i-1) mixing a first solution of ammonium fluoride in ethylene glycol with a second solution containing sodium chloride, $X(NO_3)_3$, $Yb(NO_3)_3$, and optionally $Z(NO_3)_3$, in ethylene glycol, to form a mixture;

i-2) stirring the mixture obtained at step i-1) at a temperature from about 120° C. to about 170° C. for at least two hours to form uncapped $NaX_{1-y-z}F_4Yb_yZ_z$ nanoparticles; and i-3) isolating the uncapped $NaX_{1-y-z}F_4Yb_yZ_z$ nanoparticles as a powder, or as a slurry.

10. The process according to claim 9, wherein step i-3) comprises the following steps:

i-4) addition of water, followed by centrifugation to form a supernatant and to sediment the uncapped $NaX_{1-y-z}F_4Yb_yZ_z$ nanoparticles, and subsequent decanting of the supernatant; and either i-5) drying the uncapped $NaX_{1-y-z}F_4Yb_yZ_z$ nanoparticles to yield the uncapped $NaX_{1-y-z}F_4Yb_yZ_z$ nanoparticles as a powder, and optionally subjecting the powder to a heating treatment at a temperature of between 250° C. to about 350° C. for about 1 to 3 hours;

or i-6) dispersing the uncapped $NaX_{1-y-z}F_4Yb_yZ_z$ nanoparticles in an organic solvent selected from the group consisting of a ketone, an alcohol, an ester, and mixtures thereof, followed by centrifugation to form a supernatant and to sediment the uncapped $NaX_{1-y-z}F_4Yb_yZ_z$ nanoparticles, and subsequent decanting of the supernatant to yield the uncapped $NaX_{1-y-z}F_4Yb_yZ_z$ nanoparticles as a slurry.

11. The process according to claim 10, wherein step i-4) is conducted at least twice.

12. The process according to claim 10, wherein step i-4) is conducted at least thrice.

13. A process for manufacturing a photoluminescent security feature on an article, or a value document, wherein said process comprises the steps:

applying by continuous ink-jet printing the photoluminescent security ink according to claim 1 on a surface of the article, or of a substrate of the value document so as to form a photoluminescent security ink layer, and drying the photoluminescent security ink layer to provide the photoluminescent security feature.

14. An article carrying the photoluminescent security feature obtained by the process according to claim 13.

15. The article according to claim 14, wherein the article is selected from the group consisting of cosmetic articles, nutraceutical articles, pharmaceutical articles, alcoholic and non-alcoholic beverages, tobacco articles, food products, electrical/electronic articles, automotive spare products, luxury articles and jewelry.

16. A value document carrying the photoluminescent security feature obtained by the process according to claim 13.

17. The value document according to claim 16, where in the value document is selected from the group consisting of banknotes, deeds, tickets, checks, vouchers, fiscal stamps, labels, agreements, identity documents, access documents, and packaging material for cosmetic articles, nutraceutical articles, pharmaceutical articles, alcoholic and non-alcoholic beverages, tobacco articles, food products, electrical/electronic articles, fabrics, automotive spare parts, construction materials, agrochemicals, luxury articles and jewelry.

* * * * *